(12) United States Patent
Shepherd et al.

(10) Patent No.: US 9,571,897 B2
(45) Date of Patent: Feb. 14, 2017

(54) BIT INDEXED EXPLICIT REPLICATION FOR PROFESSIONAL MEDIA NETWORKS

(71) Applicant: CISCO TECHNOLOGY, INC., San Jose, CA (US)

(72) Inventors: Gregory J. Shepherd, Eugene, OR (US); Ijsbrand Wijnands, Leuven (BE); Thomas Kernen, Russin (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/634,765

(22) Filed: Feb. 28, 2015

(65) Prior Publication Data
US 2015/0181309 A1 Jun. 25, 2015

Related U.S. Application Data

(63) Continuation-in-part of application No. 14/488,790, filed on Sep. 17, 2014, which is a continuation-in-part
(Continued)

(51) Int. Cl.
*H04L 12/28* (2006.01)
*H04N 21/647* (2011.01)
(Continued)

(52) U.S. Cl.
CPC ........ *H04N 21/64784* (2013.01); *H04L 12/18* (2013.01); *H04L 12/1886* (2013.01);
(Continued)

(58) Field of Classification Search
CPC ......... H04W 80/04; H04W 8/26; H04L 12/56;
H04L 2012/56; H04L 29/0653; H04L 29/06095; H04L 49/3009; H04L 49/309; H04L 45/74; H04L 12/5601
(Continued)

(56) References Cited

U.S. PATENT DOCUMENTS 5,999,531 A * 12/1999 Ferolito ................ H04L 49/201
370/390
6,148,000 A 11/2000 Feldman ........................ 370/394
(Continued)

FOREIGN PATENT DOCUMENTS

CN  102025538 A   4/2011
WO  WO 2007/095331  8/2007 ..................... 370/390

OTHER PUBLICATIONS

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.
(Continued)

*Primary Examiner* — Brenda H Pham
(74) *Attorney, Agent, or Firm* — Campbell Stephenson LLP

(57) ABSTRACT

Various systems and methods for performing bit indexed explicit replication (BIER). For example, one method involves receiving a first bit string at a node, encapsulating a packet with the first bit string, and forwarding the packet. The method also involves receiving a second bit string at the node and selecting the second bit string. The method also involves encapsulating a second packet with the second bit string and forwarding the second packet.

20 Claims, 18 Drawing Sheets

Related U.S. Application Data of application No. 14/488,761, filed on Sep. 17, 2014, application No. 14/634,765, filed on Feb. 28, 2015, which is a continuation-in-part of application No. 14/488,810, filed on Sep. 17, 2014.

(60) Provisional application No. 61/878,693, filed on Sep. 17, 2013, provisional application No. 61/931,473, filed on Jan. 24, 2014.

(51) Int. Cl.

| | |
|---|---|
| H04N 21/6437 | (2011.01) |
| H04N 21/643 | (2011.01) |
| H04N 21/61 | (2011.01) |
| H04L 12/18 | (2006.01) |
| H04L 12/761 | (2013.01) |

(52) U.S. Cl.
CPC ......... *H04L 45/16* (2013.01); *H04N 21/6125* (2013.01); *H04N 21/6437* (2013.01); *H04N 21/64322* (2013.01); *H04L 2212/00* (2013.01)

(58) Field of Classification Search
USPC .......... 370/389, 349, 359, 392, 396, 395.31, 370/395.3
See application file for complete search history.

(56) References Cited

U.S. PATENT DOCUMENTS

| | | | |
|---|---|---|---|
| 6,615,336 | B1 | 9/2003 | Chen .......................... 370/351 |
| 6,771,673 | B1 | 8/2004 | Baum ......................... 370/535 |
| 7,925,778 | B1 | 4/2011 | Wijnands .................... 370/389 |
| 8,320,374 | B2 | 11/2012 | de Heer ...................... 370/390 |
| 8,325,726 | B2 | 12/2012 | Baban et al. ................ 370/390 |
| 8,774,179 | B1 * | 7/2014 | Gaggara ............. H04L 45/245 370/248 |
| 8,787,400 | B1 | 7/2014 | Barth .......................... 370/419 |
| 8,848,728 | B1 | 9/2014 | Revah ......................... 370/389 |
| 8,942,256 | B1 | 1/2015 | Barth .......................... 370/255 |
| 2002/0126661 | A1 | 9/2002 | Ngai ........................... 370/380 |
| 2002/0191628 | A1 | 12/2002 | Liu ............................. 370/428 |
| 2003/0210695 | A1 | 11/2003 | Henrion ...................... 370/392 |
| 2005/0169270 | A1 | 8/2005 | Mutou ......................... 370/390 |
| 2007/0127474 | A1 | 6/2007 | Mirtorabi et al. ........... 370/390 |
| 2007/0189291 | A1 | 8/2007 | Tian ............................ 370/390 |
| 2008/0159285 | A1 | 7/2008 | De Heer ...................... 370/390 |
| 2009/0219817 | A1 | 9/2009 | Carley ...................... 370/235.1 |
| 2009/0310610 | A1 | 12/2009 | Sandstrom ................... 370/394 |
| 2011/0202761 | A1 | 8/2011 | Sarela et al. ................. 716/163 |
| 2011/0228770 | A1 | 9/2011 | Dholakia ..................... 370/390 |
| 2011/0274112 | A1 | 11/2011 | Czaszar ....................... 370/392 |
| 2012/0099591 | A1 * | 4/2012 | Kotha .................... H04L 45/54 370/392 |
| 2012/0243539 | A1 | 9/2012 | Keesara ....................... 370/392 |
| 2013/0136117 | A1 | 5/2013 | Schrum, Jr. ................. 370/338 |
| 2013/0201988 | A1 | 8/2013 | Zhou ........................... 370/390 |
| 2013/0308948 | A1 | 11/2013 | Swinkels ....................... 398/66 |
| 2013/0343384 | A1 | 12/2013 | Shepherd .................... 370/390 |
| 2014/0043964 | A1 | 2/2014 | Gabriel ....................... 370/229 |
| 2014/0119191 | A1 | 5/2014 | Onoue ........................ 370/236 |
| 2015/0003458 | A1 | 1/2015 | Li ............................... 370/392 |
| 2015/0023328 | A1 | 1/2015 | Thubert et al. .............. 370/336 |
| 2015/0049760 | A1 | 2/2015 | Xu .............................. 370/390 |
| 2015/0078377 | A1 | 3/2015 | Wijnands et al. ............ 370/390 |
| 2015/0078378 | A1 | 3/2015 | Wijnands et al. ............ 370/390 |
| 2015/0078379 | A1 | 3/2015 | Wijnands et al. ............ 370/390 |
| 2015/0078380 | A1 | 3/2015 | Wijnands et al. ............ 370/390 |
| 2015/0085635 | A1 | 3/2015 | Wijnands et al. ............ 370/216 |
| 2015/0131658 | A1 | 5/2015 | Wijnands et al. ............ 370/390 |
| 2015/0131659 | A1 | 5/2015 | Wijnands et al. ............ 370/390 |
| 2015/0131660 | A1 | 5/2015 | Wijnands et al. ............ 370/390 |
| 2015/0138961 | A1 | 5/2015 | Wijnands et al. ............ 370/228 |
| 2015/0139228 | A1 | 5/2015 | Wijnands et al. ............ 370/390 |
| 2016/0254991 | A1 | 9/2016 | Eckert et al. ................ 370/225 |

OTHER PUBLICATIONS

Eckert, T., "Traffic Engineering for Bit Index Explicit Replication BIER-TE, draft-eckert-bier-te-arch-00," Network Working Group, Internet—Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.

Yongliang Li, et al., ABSTRACT Translation of CN-201010573400-A and CN 102025538, Database EPODOC [Online], European Patent Office, Apr. 20, 2011, pp. 1-2 [XP 002740355 on Extended EP SR].

Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).

Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).

Aggarwal, R., et al., "BGP Encodings and Procedures for Multicast in MPLS/BGP IP VPNs," Internet Engineering Task Force (IETF). Request for Comments 6514, Feb. 2012, pp. 1-59.

Artel Video Systems, White Paper; "The Broadcaster's Guide to SMPTE 2022: Applications in Video Contribution and Distribution," Oct. 2014, pp. 1-7.

Bates, T. et al., "Multiprotocol Extensions for BGP-4," Network Working Group, Request for Comments 4760, Jan. 2007, pp. 1-12.

Boivie, Rick. and N. Feldman, IBM Watson Research Center; "Small Group Multicast," draft-boivie-sgm-02.txt, Internet—Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Deering, S., Cisco Systems, Inc. and R. Hinden, Nokia, "Internet Protocol, Version 6 (IPv6)," Network Working Group, Request for Comments 2460, Dec. 1998, pp. 1-39.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet—Draft, May 19, 2014, pp. 1-7.

Kumar, N., et al., "BIER Use Cases, draft-kumar-bier-use-cases-00," Network Working Group, Internet—Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet—Draft, Sep. 27, 2014, pp. 1-6.

Psenak, P. et al., Cisco Systems; "OSPF Extensions for BIER, draft-psenak-ospf-bier-extensions-01," OSPF, Internet—Draft, Oct. 24, 2014, pp. 1-8.

(56) References Cited

OTHER PUBLICATIONS

Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-l3vpn-mvpn-bier-01," Internet Engineering Task Force, Internet—Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet—Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet—Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet—Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet—Draft, Dec. 4, 2014, pp. 1-27.
Xu, X. et al., "BIER Encapsulation, draft-xu-bier-encapsulation-00," Network Working Group, Internet—Draft, Sep. 30, 2014, pp. 1-6.
Xu, X. et al., "BIER Encapsulation, draft-xu-bier-encapsulation-01," Network Working Group, Internet—Draft, Oct. 20, 2014, pp. 1-6.
Das, Kaushik, "IPv6 Header Deconstructed"; http://www.ipv6.com/articles/general/IPv6-Header.htm; Apr. 18, 2008; 2 pages.
Wijnands, Ijsbrand, et al., "Multicast Using Bit Index Explicit Replication, draft-wijnands-bier-architecture-03," Internet Engineering Task Force, Internet—Draft, Jan. 27, 2015; pp. 1-29.

* cited by examiner

| Receiver Membership Table F | | |
|---|---|---|
| Receiver | Group ID | Joined |
| R1 | G1 | Yes |
| R2 | G2 | No |

| Group | Receivers | Bit Positions |
|---|---|---|
| G1 | R2, R3, R4 | 0010, 0001, 0100 |

| Time | Group ID | Source | Membership | Bit String |
|---|---|---|---|---|
| t1 | G1 | S1 | R1,R2 | 1010 |
| t2 | G1 | S1 | R1,R3,R4 | 1101 |
| t3 | G1 | S2 | R1,R3,R4 | 1101 |

| Bit Indexed Routing Table C | | |
|---|---|---|
| SI:BP | Receiver | NBR |
| 0:1000 | R1 | D |
| 0:0100 | R4 | E |
| 0:0010 | R2 | D |
| 0:0001 | R3 | D |

*FIG. 9A*

| BIFT C | |
|---|---|
| FBM | NBR |
| 1011 | D |
| 0100 | E |

*FIG. 9B*

BIT INDEXED EXPLICIT REPLICATION FOR PROFESSIONAL MEDIA NETWORKS

RELATED APPLICATIONS

This application is a continuation-in-part of U.S. application Ser. No. 14/488,790, entitled "Bit Indexed Explicit Replication Using Multiprotocol Label Switching," filed Sep. 17, 2014, which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,761, entitled "Bit Indexed Explicit Replication," which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,810, entitled "Bit Indexed Explicit Replication Using Internet Protocol Version 6," filed Sep. 17, 2014, which in turn claims the domestic benefit under Title 35 of the United States Code §119(e) of U.S. Provisional Patent Application Nos. 61/878, 693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the two provisional and three non-provisional applications referenced above is hereby incorporated by reference in its entirety and for all purposes as if completely and fully set forth herein.

BACKGROUND OF THE INVENTION

Various industries, organizations, and technologies are involved in the production, contribution, and distribution of high-quality audio and video content. For example, television presentations of live sporting events are distributed to millions of viewers around the world. Standards and technology related to how the content is formatted and transmitted between the various elements related to production, contribution, and distribution have been developing over the past decades. The standards and technology are designed to accommodate the types of data relevant to audio and video content and particular requirements of the data. For example, there are numerous requirements related to the timing of transmission and reception of signals related to particular content sources, and of transitions between such signals. Various content transmission infrastructures exist. Many such infrastructures utilize serial data transmission.

Technology for transmitting information in packet-based systems and networks has also been developing over the past decades. This is referred to as Information Technology (IT). IT networks have become prevalent in many aspects of modern life. Many IT networks use Internet Protocol (IP) for packet routing and switching. IP-based systems form an IP-based infrastructure for transmitting information.

The Professional Media industry is becoming more interested in using IT networks for transmission of its signals relating to audio and video content. However, due to the nature of signals, and the requirements for handling those signals, implementing some of the capabilities available in IT networks presents challenges.

BRIEF DESCRIPTION OF THE DRAWINGS

The present disclosure may be better understood, and its numerous objects, features, and advantages made apparent to those skilled in the art by referencing the accompanying drawings.

FIG. 9A is an example table, according to the present description.

FIG. 9B is an example table, according to the present description.

DETAILED DESCRIPTION

Overview

Figure 1:
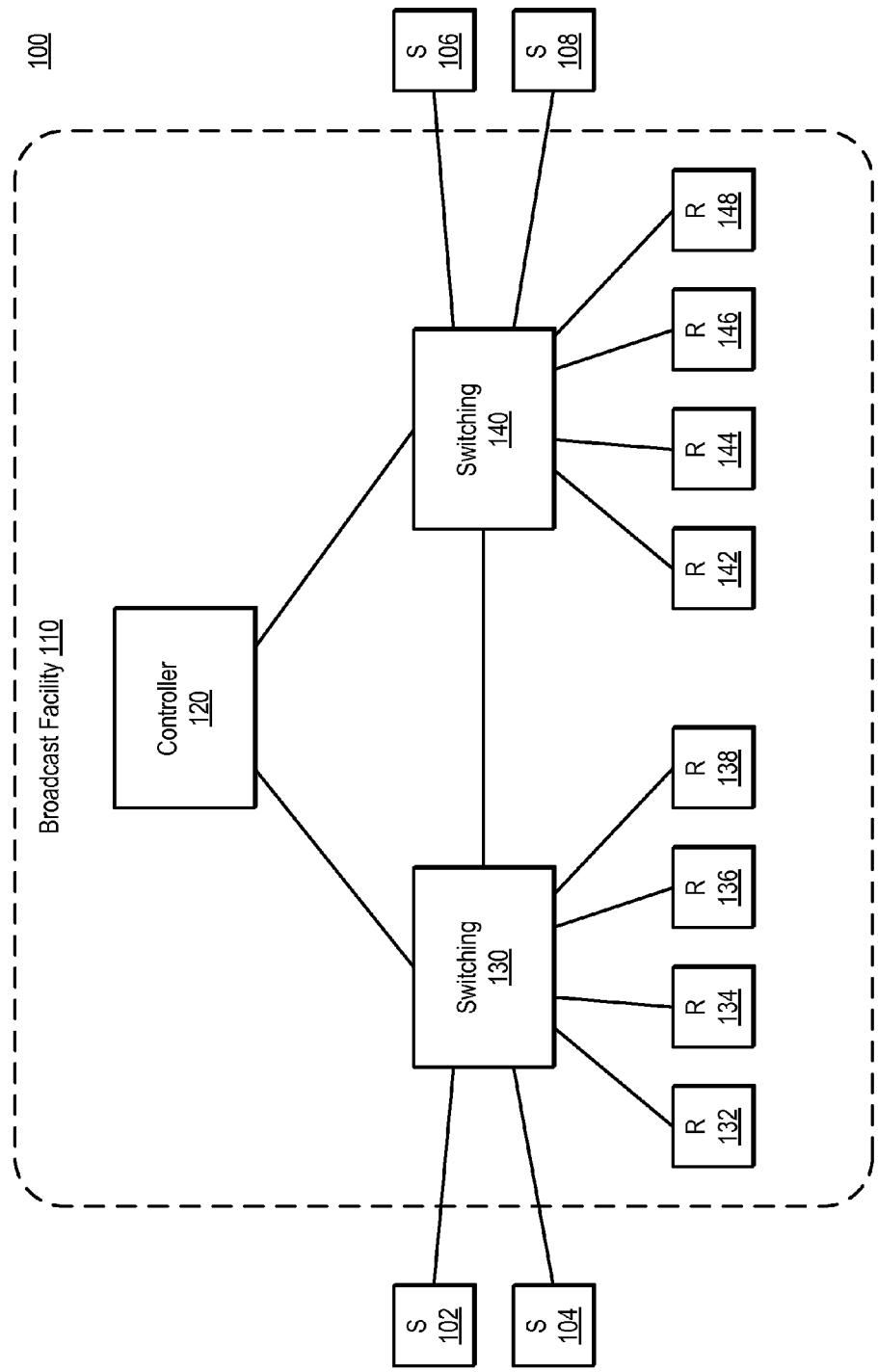
FIG. 1 is a simplified block diagram illustrating certain components of an example network.

Various systems and methods for performing bit indexed explicit replication (BIER). For example, one method involves receiving a first bit string at a node, encapsulating a packet with the first bit string, and forwarding the packet. The method also involves receiving a second bit string at the node and selecting the second bit string. The method also involves encapsulating a second packet with the second bit string and forwarding the second packet.

Professional Media Networks

Various systems exist for handling high-quality video and audio content. A Professional Media Network is one type of system, or collection of systems, that can be used for the production, contribution, and distribution of such content. In PMNs, content is often captured in one location, or several locations and processed. This is known as production or remote production and commonly involves recording content using one or more cameras and/or microphones.

The raw or produced content is then transmitted to another location or locations. This is known as contribution. Additional types of processing that are still part of the production process can be performed at these locations. Content processing in PMNs is commonly performed at a broadcast facility that includes a central connection hub or controller, such as a mixing board or switch, that provides physical connections between sources of content and a number of receivers. Content from various sources can be merged into a continuous stream and provided to potentially numerous receivers, based on control signals generated by a controller. The content may be provided in a live streaming format, file transfer, or as static images. Switching between content sources and modifying the selection of receivers that receive the stream is extremely time-dependent. If these transitions do not occur on very specific boundaries or time intervals, video and audio distortions or discontinuities can result.

The content is then transmitted to still another location for distribution to consumers. Often the content is distributed live, or in real-time, although the content can also be recorded and stored for later playback.

Transmission between locations can be performed using IT networks and/or PMNs. Eventually, the content is likely intended to be presented to viewers. If content is not properly handled, viewers can discern errors, such as delays, blank screens, momentary glitches, pops, and the like. Therefore, very strict procedures for error detection and correction, synchronization, and signal switching are adhered to in PMNs. One way to facilitate signal synchronization in PMNs is to provide each component of the PMN an external time reference, such as an analog reference signal. The components derive their timing from the reference signal. Propagation of the reference signal to each element of the PMN involves installing and maintaining a complete infrastructure just for the reference signal. Doing so is commonly extensive, expensive, inflexible, and not impervious to failure.

PMNs and Information Technology Networks

Information technology (IT) networks transmit information in packets. As used herein, transmission refers to the transfer of data, e.g., audio and video content, between points (e.g., network nodes and/or video production and distribution devices) using some medium, such as copper wire, fiber optic cable, wireless communication channels, and the like. Transmission also includes various switching and routing operations involved in relaying the data between the points. In many traditional video and audio content infrastructures, content is serially transmitted in sequence. In such infrastructures, a failure may involve only the loss of a single bit, which is tolerable. By contrast, packets in IT networks may be sent out of order, and then sequenced at a destination. The loss of a packet commonly represents the loss of a significant amount of data.

PMNs incorporate efforts to transition traditional video and audio content infrastructures to IT networks. This involves effective transmission of audio and video content in packets, regardless of the mechanisms used to capture the audio and video content, such as sampling and frame rate, or the format or resolution of the content. In some embodiments, this involves converting the content from a container format to an IT-specific format. For example, Serial Data Interface (SDI) is a format used for carrying content in many traditional video and audio content infrastructures. SMPTE ST 2022-6 is a standard that describes one way SDI content can be encapsulated into IP packets, enabling transmission of audio and video content over IP. This standard utilizes Real-time Transfer Protocol (RTP), and specifies that an RTP datagram typically includes 1376 bytes of video and related content. SDI data (e.g., video, audio, and ancillary data) can be encapsulated into a single stream of IP packets. The SDI data includes a stream of data values for each pixel that will be displayed. The data values specify the color and brightness of the pixel. When converted for encapsulation into IP packets, the SDI data is formatted as 10 bit or 12 bit samples of the color and brightness values in pixel order. A group of pixels makes up a line, and a group of lines makes up a video frame, or just frame. SMPTE ST 2022-6 also provides that switching between two signals can be performed according to RP 168-2009, which specifies a switching point to enable the downstream devices to handle the change seamlessly. While the present description refers to SMPTE ST 2022-6, other mechanisms for transmitting audio and video content in IP packets are possible, and the present description can be employed with those mechanisms as well.

One aspect of IT networking that presents particular challenges for implementation of PMN standards for transmission of video content is multicast. Multicast transmits multicast data packets (data packets that traditionally include information identifying a multicast group, such as a multicast group address) from a source to multiple receivers without unduly burdening the source. As used herein, the term "receiver" signifies a host (such as a computing device or application) that is subscribed to a multicast group. A receiver subscribes to a multicast group by sending a join message using, for example, Internet Group Management Protocol (IGMP) or Multicast Listener Discovery (MLD). Typical join messages identify, to a network node to which the receiver is coupled, the multicast group the receiver wishes to join to. Instead of the source replicating a multicast data packet and transmitting a copy of the multicast data packet to each receiver in the network, the source transmits a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

A multicast-enabled node typically include a multicast forwarding table that the multicast-enabled node uses to determine where to forward the multicast data packets associated with a given multicast group. The multicast forwarding table includes information identifying each interface of the multicast-enabled node that is connected to a multicast distribution tree (MDT) to one or more receivers for the multicast group (e.g., a host that has sent a join message. Multicast-enabled nodes inform upstream nodes that they are coupled to one or more receivers using join messages, for example, a protocol independent multicast (PIM) join message. In response to receiving the join messages, a multicast-enabled node updates its multicast forwarding tables to identify interfaces to which multicast data packets should be forwarded. The multicast data packets can be replicated by the multicast-enabled node as needed in order to provide the multicast data packets to receivers for the multicast group and other multicast-enabled nodes on the MDT.

As can be seen, the processes traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability. Setting up the MDTs also takes a non-deterministic amount of time. This presents a problem for PMN content. With PMNs, the set of receivers for a particular source is specified by a central controlling authority. When the central controlling authority determines that the source should be sent to a new set of receivers, a switch occurs. The switch timing is carefully controlled to prevent or minimize signal discontinuity. However, with multicast, the central controlling authority would have to signal a switch to the receivers, then wait for the receivers to join and for the MDT to be built hop-by-hop to the source. This fails to provide the deterministic switch times called for by PMNs.

One way to implement IP multicast and possibly reduce delays due to tree building and resulting issues with switching between video signals and would be to have receivers join a multicast group prior to actually switching from one signal to another. The nodes could then build an additional MDT for the new set of receivers. However, this approach would result in multiple MDTs and wasted bandwidth and processing resources (e.g., due to receiving packets at a node only to drop them until the switch occurs). This approach also fails to provide a guarantee that the "spare" MDT would be built in time to avoid any signal discontinuities. This approach would also involve advance notice of switching decisions that may not be available. Thus, the method of building duplicate MDTs in advance is undesirable for a number of reasons. Described below are systems and methods for implementing IP networking, in particular multicast, with PMNs in such a way that the strict timing specifications of PMNs are met.

FIG. 1 shows an example professional media network (PMN) 100. The elements of PMN 100 capture, produce, and distribute content, such as audio content and/or video content. As used herein, video content, or simply video, includes digital video made up of video luminance and color-difference values. Video can also include, for example, vertical ancillary data, horizontal ancillary data, metadata, time code information, closed captions, graphics, test signals, content ratings, quality data, and the like. Additional video elements can include live camera signals, prerecorded material from video tape recorders and/or media servers, graphics, remote feeds, images from a still storage device, outputs of digital video effects units, and the like. Audio content, or simply audio, can include, for example, live studio microphones, prerecorded jingles, bridges from audio servers or audio recording devices, audio from the video recorders or remote sites, outputs of audio effects equipment, telephone interfaces, and the like. All of the above are referred to collectively herein, for the sake of simplicity, as video, or video content. Video can be standard definition, high definition, ultra high definition, or any other resolution or format, and can be compressed or uncompressed. In addition to video content, PMN 100 also transmits control content among the elements of PMN 100. Control traffic can be used to access state, manipulate state, and perform action on elements of PMN 100. Control traffic is typically used to deliver deterministic and low latency performance, and typically includes small, low bandwidth messages.

PMN 100 includes sources S102 through S108 and a broadcast facility 110. Sources 102 through 108 can be implemented as, for example, one or more cameras, microphones, or any other equipment capable of capturing audio and/or video content, and transmitting that content to other elements of PMN 100. For example, multiple cameras and microphones are often used to cover a live sports program. Signals (e.g., audio and video) from these sources are transmitted to switching elements in broadcast facility 110 to produce a finished program in real time. Though shown as being external to broadcast facility 110, sources S102 through S108 can be included within broadcast facility 110.

Broadcast facility 110 includes a controller 120, switching elements 130 and 140, and receivers 132 through 138 and 142 through 148. Broadcast facility 110 can be implemented, for example, as a television studio, production control room, master control room, or remote broadcast facility, such as an Outdoor Broadcast (OB) truck. Broadcast facility 110 can include numerous individual elements, such as video and audio monitors at numerous work stations staffed, for example, by directors, producers, and the like, referred to herein as operators. Some or all of the elements in broadcast facility 110 are synchronized to show the same moment in time in the audio and video in a continuous stream at a constant rate. For example, several operators can collaborate at their individual workstations on such video processing tasks as color correction, audio and video effects production, and the like. The monitors on which these tasks are performed should be identical in terms of time and video quality.

Controller 120 is an example of a central controlling authority used, for example, by an operator, to control what content is provided to which receivers, and when that content is provided to the receivers. Since multiple elements are often involved in a video processing task, control of these devices is critical and timing of control commands is extremely time sensitive. In one embodiment, controller 120 is implemented as a video switch control console and/or one or more mixing boards or stations. Controller 120, in response to operator input, or automatically, for example, in response to pre-configured instructions or routines, sends control commands to switching elements 130 and 140, indicating what content, such as content received from one or more sources 102 through 108, is provided to which receivers, such as receivers 132 to 138 and 142 to 148, and when the content is provided. Since video production often involves switching signals from different sources to different receivers, these transitions are timed to occur, for example, at the start of a video frame or at the end of a video frame. The elements of broadcast facility should have knowledge of the frame boundaries in video so that the switches can occur at specific frame boundaries.

Switching elements 130 and 140 receive control commands from controller 120, and in response to those control commands, transmit content, such as content received from sources 102 through 108, to one or more of receivers 132 to 138 and 142 to 148, at the time specified by controller 120. Switching elements 130 and 140 are implemented as, for example, one or more network switching elements, such as one or more switches and/or routers.

Content can be transferred between the elements of professional media network 100 using one or more proprietary standards, such as Serial Digital Interface (SDI) developed by the Society of Motion Picture and Television Engineers (SMPTE). Alternatively, or in combination, content can be transferred using IT networking technology, such as Internet Protocol (IP).

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified receivers. BIER enables packets to be forwarded from a source to a single or multiple receivers without the use of multicast distribution trees and per-group state information at each node between the source(s) and receiver(s).

Figure 2:
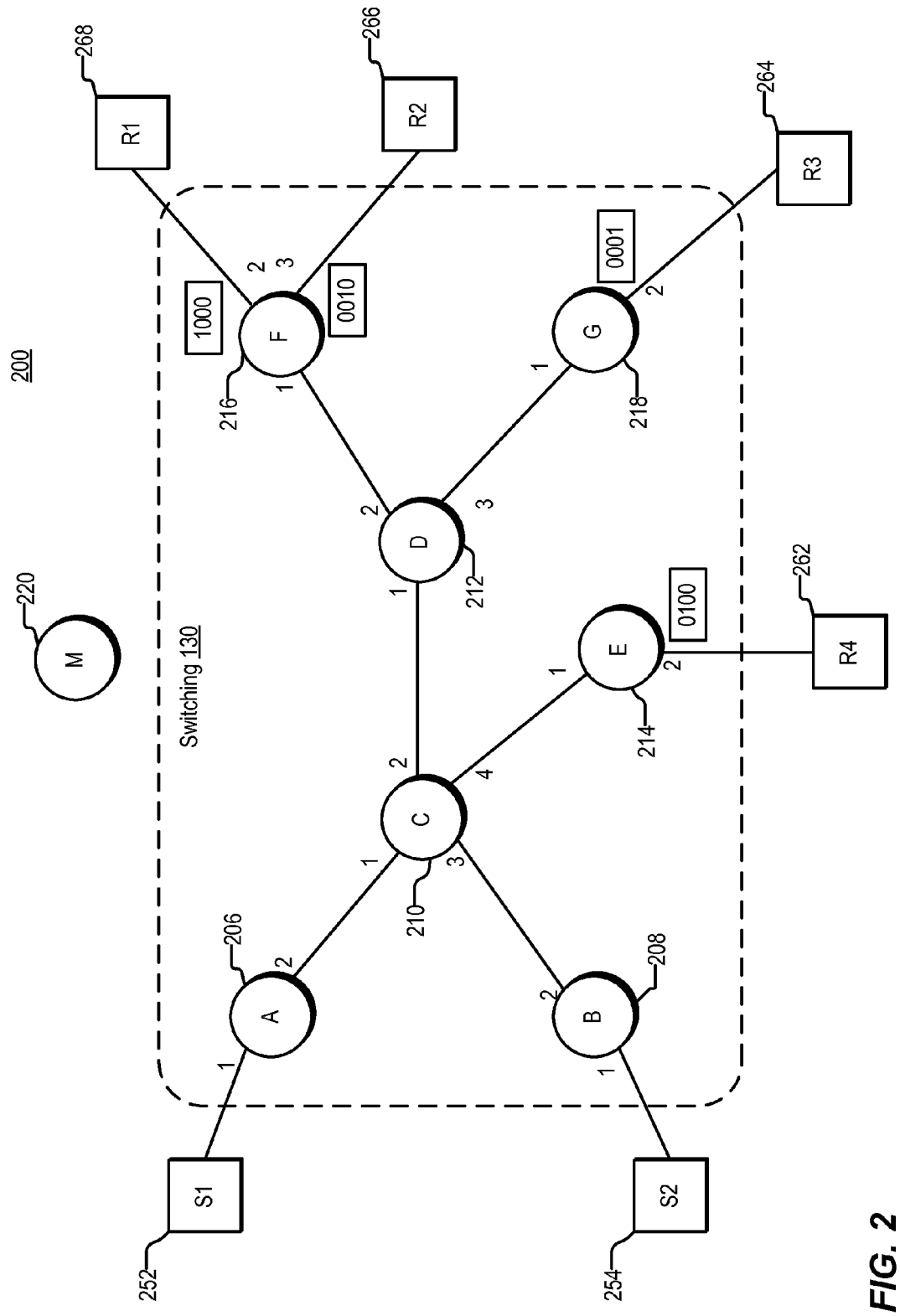
FIG. 2 is a simplified block diagram illustrating certain components of an example network.

FIG. 2 shows an example network 200. Network 200 includes BIER-enabled nodes 206-218. BIER-enabled nodes are configured to forward packets using BIER, and are sometimes referred to as bit forwarding routers (BFRs). BIER-enabled nodes 206-218 form a provider network, or domain. Such a provider network could be employed, for example, by an Internet service provider to transport packets to customers, in a broadcast facility to distribute video content, or in a mobile event network deployed temporarily at the site of a live broadcasted event. In one embodiment, network 200 is part of a larger network incorporating multiple such domains. The domain includes transit nodes 210 and 212, and edge nodes 206, 208, 214, 216, and 218. In one embodiment, the BIER-enabled nodes are included in a PMN. For example, switching elements 130 and/or 140 in FIG. 1 can be implemented as the BIER-enabled nodes. Sources 252 and 254 are devices configured to capture and transmit video content to nodes 206 and 208. Receivers 262, 264, 266, and 268 are devices coupled to nodes 214, 216, and 218 and configured to receive content from the respective nodes to which receivers 262, 264, 266, and 268 are coupled. Sources 252 and 254 can also be configured to act as receivers, e.g., receive content from nodes 206 and 208, in addition to acting as sources. Receivers 262, 264, 266, and 268 can also be configured to act as sources, e.g., to transmit content to nodes 214, 216, and 218, in addition to acting as receivers. For example, receiver 262 can receive content, process the content, and transmit the processed content to one or more of the other receivers, such as 264, 266, and 268.

Each of the BIER-enabled nodes 206-218 has interfaces that are identified as shown. For example, BIER-enabled node 210 has four interfaces designated 1-4, respectively. Each BIER-enabled node is assigned a unique identifier or routable address known as a router identifier (RID). The RID can be implemented as, for example, an internet protocol (IP) address, a prefix, or a loopback address. Each BIER-enabled node advertises or floods the routable address to all other BIER-enabled nodes in network 200. Each BIER-enabled node builds a unicast topology of the BIER-enabled nodes in network 200 using the advertised routable addresses. BIER network 200 also includes a controller 220. The controller performs configuration and administrative tasks, as described below, in addition to the control tasks described with regard to controller 120 of FIG. 1.

BIER-enabled nodes 206 and 208 are configured as a bit forwarding ingress routers (BFIRs) for multicast data packets (packets associated with a particular multicast group and/or packets being transmitted from one point to many points). Video content from sources 252-258 enters the BIER network via the BFIRs (BIER-enabled nodes 206 and 208). Each of BIER-enabled nodes 214, 216, and 218 is configured as a bit forwarding egress router (BFER). The BFERs can be coupled to receivers, or to other networks. A BFER is a BIER-enabled node that is the last BIER-enabled node on a path between a source and a receiver. BIER-enabled edge nodes can be both BFIRs and BFERs. That is, a BIER-enabled edge node can receive a multicast data packet destined for a receiver, de-encapsulate the multicast data packet, and forward the multicast data packet's content to a receiver. The BIER-enabled edge node can subsequently receive content from the receiver, encapsulate the content into a multicast data packet, and forward the multicast data packet using BIER.

Assigning a Bit Position in the Bit String

As noted, each BFR can include a number of interfaces. Each interface of a BFR can be connected to one or more sources and/or one or more receivers. Interfaces that can be coupled to devices configured to act as receivers are referred to herein as receiver interfaces and can be assigned, e.g., by a controller, a bit position (BP) from an array of bits. The array of bits can be carried in a multicast data packet or other network message. The array of bits can also be stored in forwarding and/or routing tables stored by BIER-enabled nodes and the controller. For the sake of clarity, the terms used herein are "bit string" (when the array of bits is in a multicast data packet) and "bit mask" (when the array of bits is stored in a table).

The bit string (or bit mask) can have a fixed or variable length. The length of the bit string used in the BIER network can be statically configured or dynamically assigned, and is distributed through the BIER network. In one embodiment, the length of the bit string is between 256 and 1024 bits, though shorter or longer bit strings can be used. The maximum length of the bit string value is determined, in one embodiment, by hardware or software limitations of the BIER-enabled nodes in the BIER network. In one embodiment, different BIER-enabled nodes in the BIER network use different lengths for their respective bit strings. For example, one BIER-enabled node may have a maximum bit string length of 128 bits while another BIER-enabled node may have a maximum bit string length of 256 bits. A bit string is one type of multicast forwarding entry in which each bit position of multiple bit positions is an element that can be used to represent an individual node or interface. Other types of multicast forwarding entries with other types of elements can be used.

A bit position (BP) is statically or dynamically assigned to each receiver interface. Each receiver interface should have at least one unique bit position from the bit string. In one embodiment, a central authority, such controller 220, assigns the BPs to the receiver interfaces. As shown in the example of FIG. 2, network 200 utilizes a four bit long bit string. Each of the four receiver interfaces in network 200 is assigned a BP: node 214's interface 2 (coupled to receiver 262) is assigned BP {0100}; node 218's interface 2 (coupled to receiver 264) is assigned BP {0001}; node 216's interface 2 (coupled to receiver 268) is assigned BP {1000}; and node 216's interface 3 (coupled to receiver 266) is assigned BP {0010}.

Sets

The number of receiver interfaces that can be addressed (assigned a BP) is limited by the size of the bit string included in the multicast data packet. If the bit string is four bits long, the number of receiver interfaces that can be addressed is four. The concept of sets allows an increase in the number of receiver interfaces that can be assigned BPs. The set identifier (SI) is, for example, a number between 0 and 255. The SI allows a BP to be unique in the context of a set. For example, each BP can be re-used in each set. In an embodiment with 256 sets and a bit string length of 256 bits, 65536 (256×256) receiver interfaces can be supported. In one embodiment, BIER-enabled nodes in the BIER network generate separate forwarding information for each SI. For example, if two different set identifiers are in use in the BIER network, the BIER-enabled nodes generate two bit indexed forwarding tables (BIFTs), one corresponding to each SI. In response to receiving a multicast data packet having a SI, the BIER-enabled node uses the SI to select which forwarding information (e.g., BIFT) to use to forward the multicast data packet.

The controller can divide the receiver interfaces into sets, each set being associated with its own bit string. This results in a reduced number of bits that are carried in multicast data packets and used to forward the multicast data packet. For example, a large event can have more receivers than can be accommodated in a single set, e.g., more than 256 if that is the length of the bit string being used. In this example, the receivers are divided into sets and each set is assigned a SI. The controller can map each SI to a multicast group ID associated with the large event. In the example where a large event is divided into multiple sets, each having its own set identifier, each of the set identifiers is mapped to the same multicast group. All of the receivers associated with the large group join the multicast group, enabling each of the receivers to receive content associated with the multicast group associated with the large event, regardless of the set identifier associated with a given multicast data packet. The controller can store information mapping set identifiers to multicast groups in a table. In one embodiment, a single set identifier is mapped to multiple multicast groups and receivers can join one or more of the multiple multicast groups.

In one embodiment, the controller assigns a single multicast group ID to an event group. The controller selects a set of receivers to be associated with the event group and the receivers specified by the controller join the event group, e.g., by sending (*,G) IGMP membership report to BFR(s) to which the receivers are coupled. This results in the BFR(s) accepting multicast data packets from all sources sending multicast data packets associated with the multicast group. No trees are built from the BFRs to the sources, the receivers accept the multicast data packets without having to be informed in advance of the sources for the multicast group, the BFRs need not maintain multicast state information (e.g., an output interface list (OIF) for each multicast group), and the BFRs need not signal the network of new IGMP membership.

Using BIER in a PMN

Figure 3A:
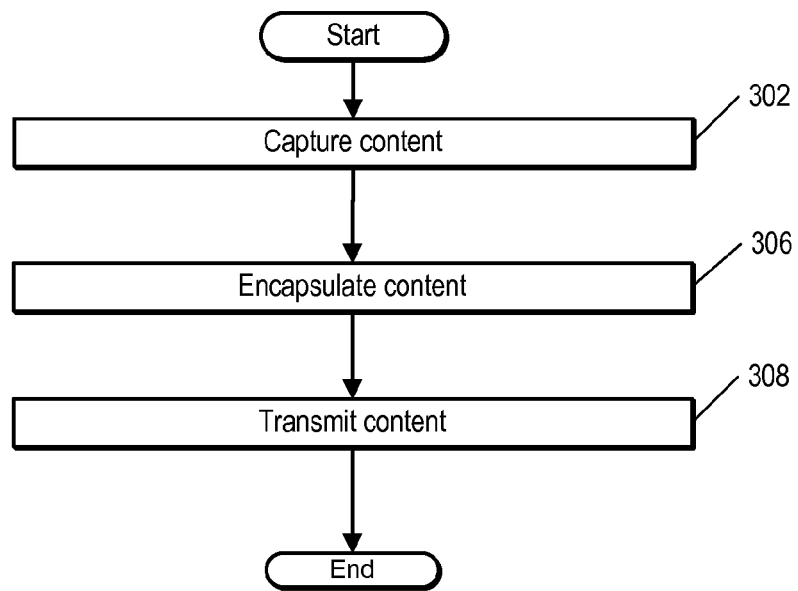
FIG. 3A is a flow chart illustrating an example process, according to the present description.

FIG. 3A is a flowchart that illustrates an example process according to the present description. In one embodiment, the process shown in FIG. 3A is performed by a source, such as one of sources 252 through 254 of FIG. 2. At 302, the source captures video content. In one embodiment, capturing the video content involves recording the video content or otherwise acquiring the video content, e.g., via a file transfer or video feed. The video content can be captured using a proprietary format, such as SDI, or any other format.

Figure 12A:
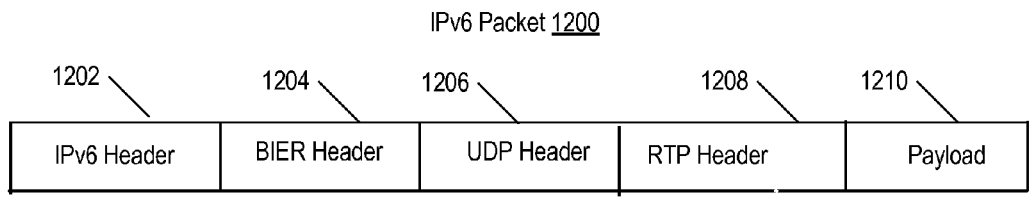
FIG. 12A is an example packet format, according to the present description.

At 306, the source encapsulates the video content into an IP packet. As noted above, SMTPE ST 2022-6 is one protocol for encapsulating SDI data into IP packets. An example packet is illustrated in FIG. 12A. In one embodiment, encapsulating the video content involves adding one or more headers to the video content, such as a BIER header and an IP transport header. At 308, the source transmits the video content. For example, the source transmits the content to a BFIR, such as one of BFIRs 206 and 208 of FIG. 2. While the converting and encapsulation operations are described as being performed by a source prior to transmitting the video content, in one embodiment, the source transmits the captured content (e.g., using SDI data and a satellite relay) to a BFIR, and the BFIR converts the video content to IP and encapsulates the content.

Figure 3B:
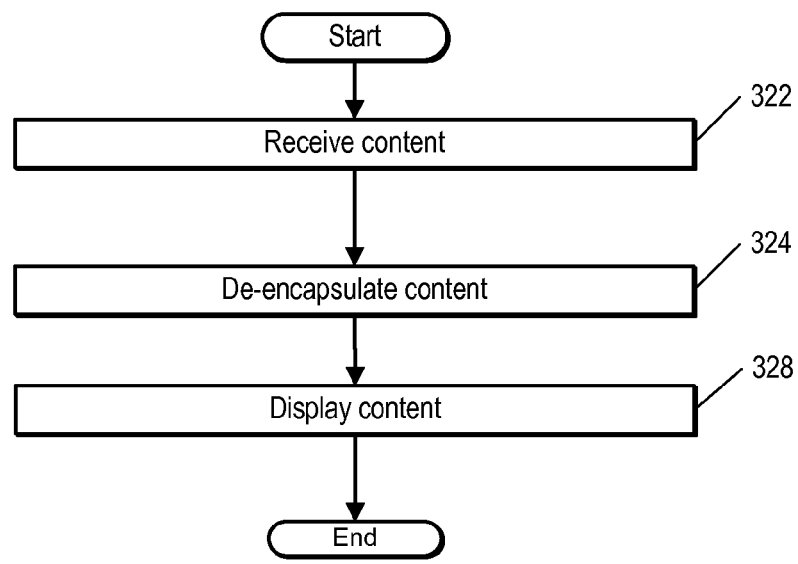
FIG. 3B is a flow chart illustrating an example process, according to the present description.

FIG. 3B is a flowchart illustrating an example process according to the present description. In one embodiment, the process of FIG. 3B is performed by a receiver, such as of one of receivers 262 to 268 of FIG. 2. At 322, the receiver receives a multicast data packet including, for example, video content in the payload of the multicast data packet. In one embodiment, the content is received from a BFER, such as one of BFERs 214 through 218 of FIG. 2.

At 324, the receiver de-encapsulates the video content. In one embodiment, de-encapsulating the video content involves removing one or more headers from an IP packet. In one embodiment, de-encapsulating the video content involves re-constructing timing information and sequence information for the video content. While the de-encapsulation is described as being performed by the receiver, in one embodiment, the BFER de-encapsulates the content and transmits the video content to the receiver using, for example, SDI or some other format. At 328, the receiver processes the video content. Processing the video content can involve, for example, modifying the video content, mixing the video content with other content, displaying the video content, and or transmitting the video content to one or more BIER-enabled nodes or receivers. Displaying the video content involves, for example, reproducing video and/or audio images using a screen and or speakers.

Figures 4A, 4B:
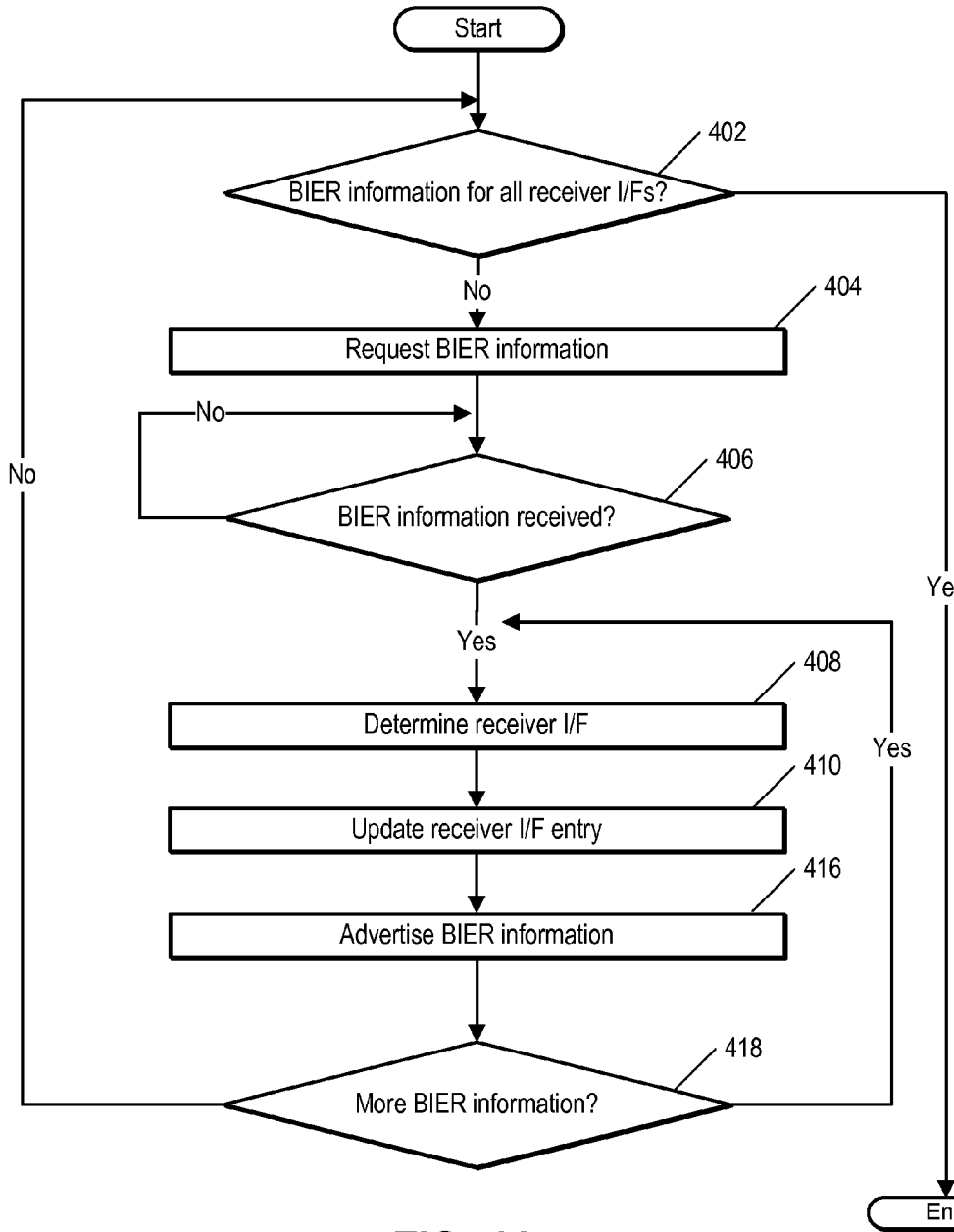
FIG. 4A is a flow chart illustrating an example process, according to the present description.
FIG. 4B is an example table, according to the present description.
Figures 4C, 4D:
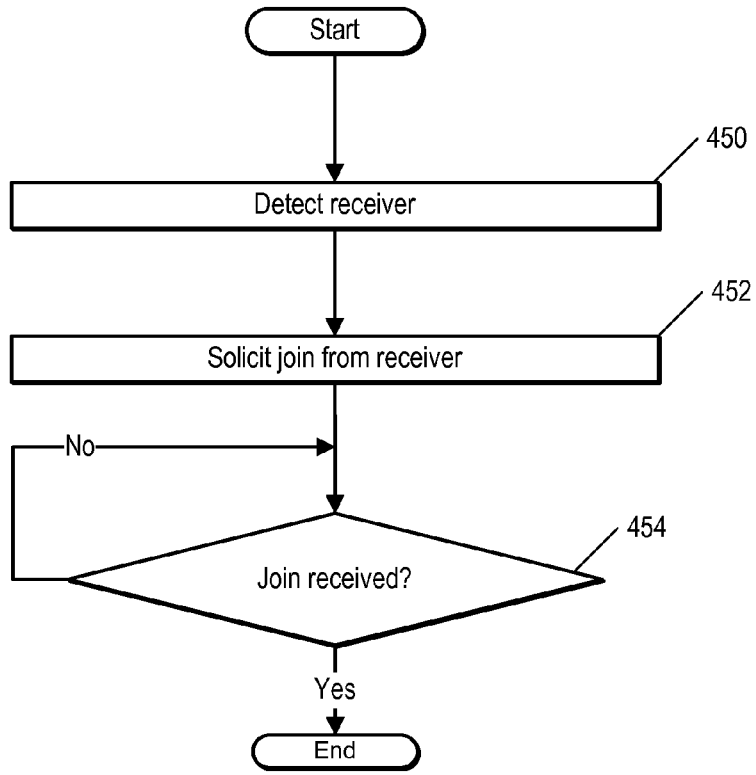
FIG. 4C is a flow chart illustrating an example process, according to the present description.
FIG. 4D is an example table, according to the present description.

FIG. 4A is a flowchart that illustrates a process according to the present description. In one embodiment, the process illustrated in FIG. 4 is performed by a BFER, such as one of BFERs 214 through 218 of FIG. 2. At 402, the BFER determines whether the BFER has BIER information for all receiver interfaces. In one embodiment, BIER information for a receiver interface includes a bit position and (optionally) a set identifier for the receiver interface, e.g., as assigned by a controller. In one embodiment, determining whether BIER information for all receiver interfaces is stored involves accessing a table, such as receiver interface table shown in FIG. 4C. The receiver interface table can be stored in the BFER's memory, or can be remotely located (e.g., at a controller, such as controller 220 of FIG. 2) and accessed via a query to the controller and response from the controller.

If the BFER determines at 402 that the BFER does not have BIER information for all receiver interfaces, the BFER requests BIER information for those receiver interfaces that do not have BIER information stored in the receiver interface table, at 404. In one embodiment, requesting BIER information involves sending a query to the controller. At 406, the BFER waits to receive the requested BIER information. In one embodiment, the controller automatically provides the BIER information to the BFER, e.g., in response to detecting that the receiver interface is coupled to a receiver that has come online, that the receiver interface does not have BIER information assigned, or that the BIER information for the receiver interface should be changed.

In response to receiving the requested BIER information (e.g., including information mapping an SI:BP assignment to a receiver interface) from the controller, the BFER determines, at 408, which receiver interface the received BIER information applies to. In one embodiment, the BFER parses a message from the controller to locate a field in the message that includes information that identifies one or more receiver interfaces, such as a receiver interface identifier. At 410, the BFER updates an entry in the receiver interface table that corresponds to the receiver interface. Updating a receiver interface's entry involves, in one embodiment, storing information that identifies the receiver interface's bit position and set identifier. In one embodiment, the BIER information received from the controller also includes information identifying one or more multicast groups for each receiver interface.

At 416, the BFER advertises the BIER information to some or all of the other BFRs in the network. In one embodiment, the BFER advertises its BP and SI via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BIER-enabled nodes in a BIER network, not just the BFERs, also flood their router identifier, which is used in building network topology and unicast forwarding tables. BIER-enabled nodes, in one embodiment, advertise additional information as well, such as a bit string size that the BIER-enabled node is configured to use. Adding such BIER information to the advertised information is a relatively small amount of additional information, as compared with the state information maintained on a per-group basis in traditional multicast.

At 418, the BFER determines whether more receiver interface information was received from the controller. If not, the method returns to 402, where the BFER determines whether BIER information for all receiver interfaces has been received. If so, the method ends. Otherwise, if more receiver information was received, the BFER returns to 408 and processes received information.

FIG. 4B shows a receiver interface table 430. In one embodiment, receiver interface table 430 is generated by a BFER, such as BFER 216 of FIG. 2. The receiver interface table 430 includes a column with information that identifies receiver interfaces, as shown at 432. At 434, receiver interface table 450 includes a column that identifies the bit position associated with the corresponding receiver interface. At 436, receiver interface table 450 includes a column that identifies one or more multicast groups associated with the receiver interface.

FIG. 4C is a flowchart that illustrates a process according to the present description. In one embodiment, the process illustrated in FIG. 4 is performed by a BFER, such as one of BFERs 214 through 218 of FIG. 2. At 450, the BFER detects that a receiver is coupled to (reachable via) one of the BFER's receiver interfaces. At 452, the BFER solicits a join from the receiver that is reachable via the receiver interface. In one embodiment, the BFER sends information identifying the multicast group, such as a group ID, to the receiver. The multicast group that the receiver is to join is specified to the BFER by a controller, such as controller 220 of FIG. 2. In one embodiment the controller sends a control message to the BFER. The control message includes information indicating which multicast group or groups each of the receivers coupled to the BFER should join. At 454, the BFER waits to receive a join request from the receiver. In one embodiment, the join request is implemented as a (*, G) join message sent, for example, using an Internet Group Management Protocol (IGMP) or Multicast Listener Discovery (MLD) using Internet Control Message Protocol (ICMP). In one embodiment, the controller, rather than the BFER, sends a control command to the receiver identifying the multicast group and instructing the receiver to join the multicast group.

FIG. 4D shows a receiver membership table 470. In one embodiment, receiver membership table 470 is generated by a BFER, such as BFER 216 of FIG. 2. The receiver membership table 470 includes a column with information that identifies receivers, as shown at 472. At 434, receiver membership table 470 includes a column that identifies the multicast group or groups to which the corresponding receiver is assigned. At 476, receiver membership table 450 includes a column that includes information indicating whether the BFER has received a join message from the receiver for the corresponding multicast group(s).

Figure 5:
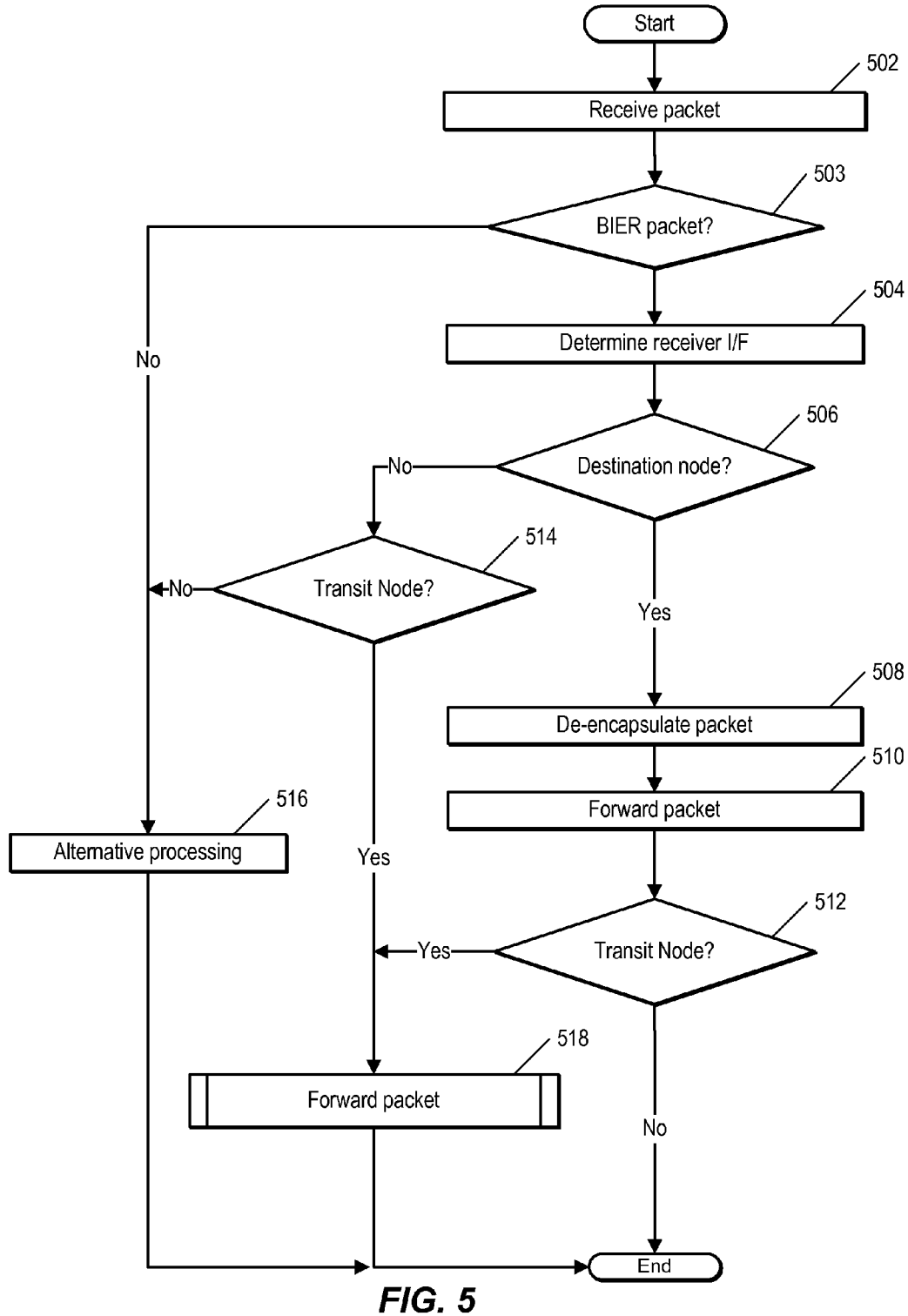
FIG. 5 is a flow chart illustrating an example process, according to the present description.

FIG. 5 is a flowchart illustrating an example process according to the present description. In one embodiment, the process of FIG. 5 is performed by a BFER, such as BFER 216 of FIG. 2. At 502, the BFER receives a multicast data packet. The BFR determines, at 503, whether the multicast data packet is a BIER packet, and therefore includes a bit string. In one embodiment, the BFR scans the header of the multicast data packet for a value that indicates that the multicast data packet is a BIER packet. The BFR can detect that the sender of the multicast data packet was a BFR and therefore conclude that the multicast data packet is a BIER multicast data packet. If the multicast data packet is not a BIER multicast data packet, the BFR performs alternate processing at 516. In one embodiment, alternate processing 516 involves flooding the multicast data packet to all interfaces on the BFR, or dropping the multicast data packet. Alternatively, if traditional multicast forwarding information is available, the BFR can use that information to forward the packet.

At 504, the BFER determines the receiver interface(s) to which the multicast data packet is destined. In one embodiment, this involves accessing the bit string in the multicast data packet and comparing which bits in the bit string are set with topology information (e.g., a list or table of entries) that maps bit position to receiver interface. At 506, the BFER determines whether the BFER is a destination node as concerns any of the receiver interfaces identified by the bit string in the packet. If the BFER determines that it is not a destination node, the BFER determines, at 514, whether the BFER is a transit node via which the receiver interface is reachable. If not, the packet has been received in error, and the BFER performs alternative processing at 516. If the BFER is a transit node, the BFER forwards the packet, at

518. Additional details regarding forwarding the packet are discussed with regard to FIG. 13.

If the BFER determines, at 506, that the BFER is a destination node for the receiver interface, the BFER de-encapsulates the packet at 508. In one embodiment, de-encapsulating the packet involves removing BIER forwarding information, such as a bit string and set identifier. At 510, the BFER forwards the packet to the receiver interface indicated by the packets bit string. At 512, the BFER determines whether the BFER is also a transit node for the packet. If so, the BFER forwards the multicast data packet at 518, as discussed at FIG. 13.

Figures 6A, 6B:
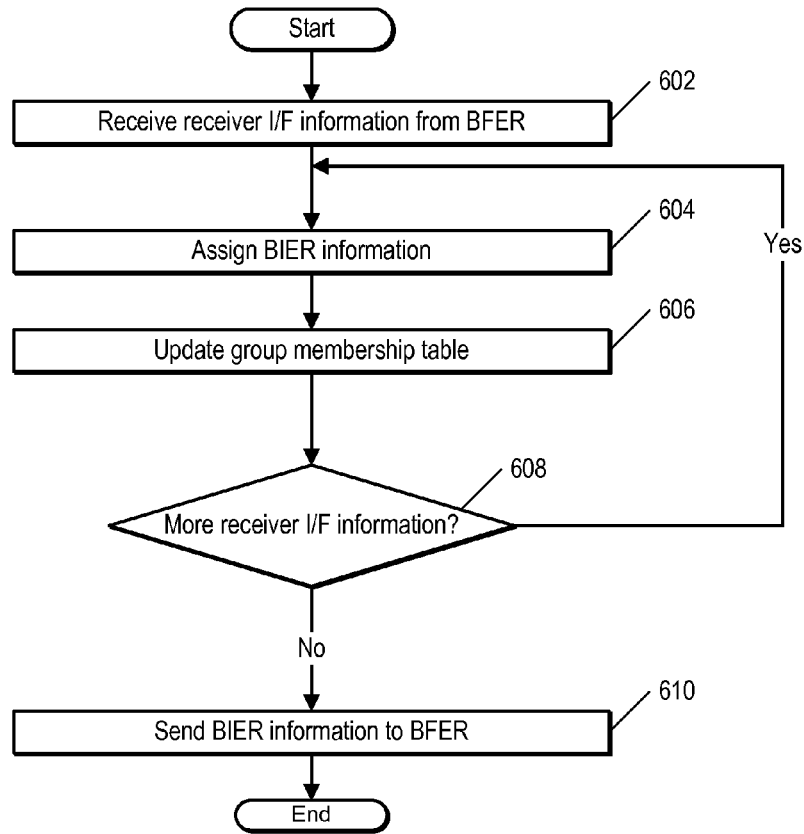
FIG. 6A is a flow chart illustrating an example process, according to the present description.
FIG. 6B is an example table, according to the present description.

FIG. 6A is a flowchart illustrating a process according to the present description. In one embodiment, the process of FIG. 6A is performed by a controller, such as controller 220 of FIG. 2. At 602, the controller receives receiver interface information from a BFER, such as one of BFERs 214 through 218 of FIG. 2. In one embodiment, the receiver interface information includes a receiver interface on the BFER via which one or more receivers is reachable, as well as other information, such as information identifying the receiver(s).

At 604, the controller assigns BIER information to the receiver interface via which the receiver is available. In one embodiment, this involves assigning a bit position, set identifier, and/or multicast group to which the receiver interface is assigned. There are a number of mechanisms the controller can utilize to determine the BP that will be assigned to a given receiver interface. In one embodiment, the controller selects the next available (unassigned) BP and assigns it to the receiver interface. In another embodiment, the controller selects a BP based on location (relative to physical geography or relative to network topology), type or function of receiver, multicast group that the receiver is assigned to, or some other bit position assignment criteria.

At 606, the controller updates a group membership table corresponding to the multicast group the receiver is assigned to. The table includes an entry for each multicast group the controller is aware of, information identifying each receiver that has joined each of the multicast groups, and, optionally, information identifying the bit position and set identifier assigned to the receiver interface via which each of the receivers is reachable.

At 608, the controller determines whether more receiver interface information was received from the BFER. If so, the controller assigns BIER information to the next receiver interface and updates the group membership table for the additional receiver. Otherwise, the controller sends the BIER information to the BFER at 610.

FIG. 6B shows a group membership table 650. In one embodiment, group membership table 650 is created and maintained by a controller, such as controller 220 of FIG. 2. At 652, the group membership table includes information identifying a multicast group, such as a group identifier. At 654, group membership table 650 includes information identifying each receiver that has joined the multicast group. At 656, the group membership table includes information identifying the receiver interfaces via which the receivers listed at 654 can be reached. In one embodiment, the list is represented as a bit string.

Figures 7A, 7B:
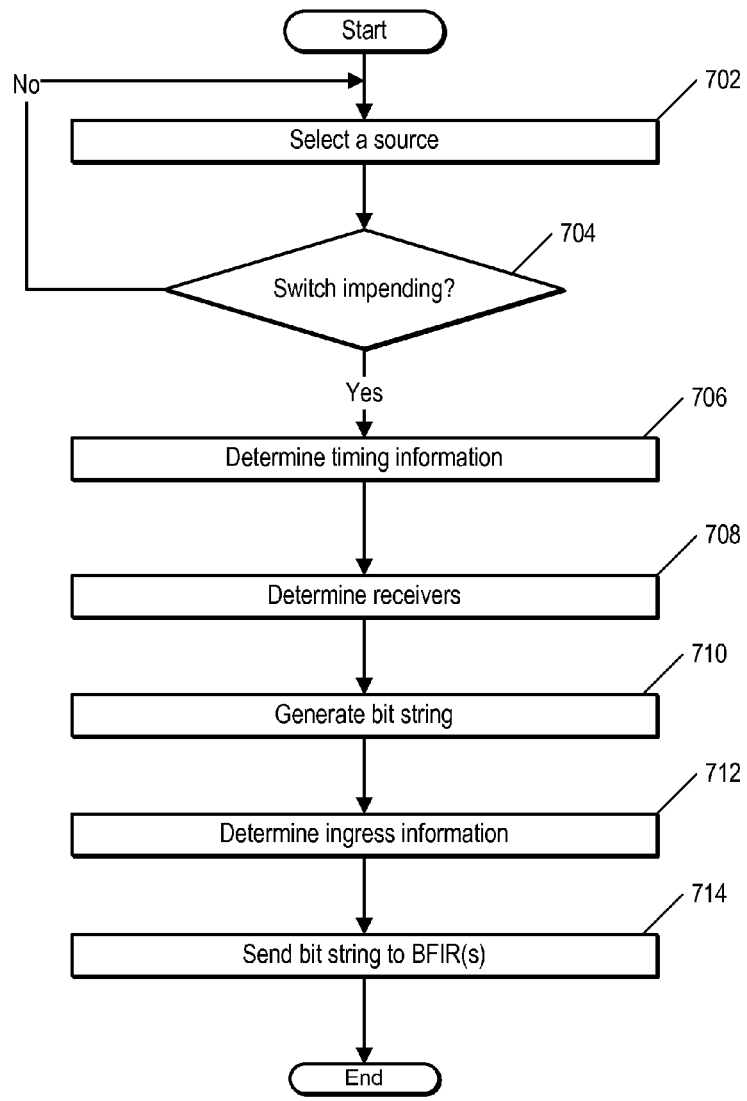
FIG. 7A is a flow chart illustrating an example process, according to the present description.
FIG. 7B is an example table, according to the present description.

FIG. 7A is a flowchart illustrating an example process according to the present description. In one embodiment, FIG. 7A is performed by a controller, such as controller 220 of FIG. 2. At 702, the controller selects a source, such as one of sources 252-254 of FIG. 2. Selecting a source is preliminary to determining whether a group of receivers to which content from the source is or will be provided is up to date. An operator can manually select a source, or a source can be automatically selected by the controller. In one embodiment, the controller selects a source in response to detecting an event, or the occurrence of some source selection criteria such as a change in content, a change in one or more receivers, such as one of receivers 262-268 of FIG. 2, or in response to detecting a time criteria is met. For example, the controller can detect that a source is about to cease providing content, or begin providing content, or that a receiver has come online, or is about to go offline or view different content than is provided by the source. In one embodiment, the controller can sequentially access a list of sources to determine if any of the sources should provide content to more or fewer receivers than the source is providing content to at the time of the access. In one embodiment, the controller selects an ingress interface, e.g. on one of BFIRs 206-208 of FIG. 2, instead of, or in addition to selecting a source. An ingress interface is, in one embodiment, an interface configured to receive content from a source, e.g., by virtue of being coupled to the source. Selecting an ingress interface indicates that transmission of any content received from the ingress interface will be affected by any changes made to the receivers associated with the ingress interface.

At 704, the controller determines whether a switch is impending. A switch can be performed, for example, in response to a user's input, or automatically, for example, in response to a pre-configured event. In one embodiment, a switch involves determining that content from a particular source, or associated with a particular multicast group, that is being sent to a first set of receivers should be sent to a different set of receivers. The different set can overlap partially or wholly with the first set. That is, a switch involves changing the receivers to which content from a particular source or associated with a particular multicast group is transmitted. A switch can also, or in the alternative, involve selecting a different source to provide content to one or more receivers.

In response determining that a switch is impending, the controller determines timing information for the switch to occur at 706. For example, the controller can specify that on the first content boundary after a particular time interval or event occurrence, the membership should be switched. In one embodiment, the membership (e.g., set of receivers) remains the same, but the source of content distributed to the membership changes.

The timing of a switch is important and occurs at a designated point, or within a pre-specified time interval after a designated point, in order to prevent or minimize the effects of any signal discontinuity. Video signals are typically divided line-by-line and frame-by-frame. The vertical blanking interval (VBI) is the time between the end of the final line of a frame and the beginning of the first line of the next frame. The horizontal blanking interval (HBI) is the time between successive lines. An end of active video (EAV) packet, e.g., a packet which has a flag set indicating that the packet is the last packet in a line is sent right before HBI. An EAV packet with a flag set indicating that the packet is the last packet in a frame is sent right before the VBI. Between the end of a portion (e.g., one line of a frame, or one frame to the next) and the start of the next portion of video there is an interval where no video is sent (or all black pixels). In IP, this can be the first few packets after the EAV. Switches that occur during this interval do not adversely affect signal continuity since no actual video content is being transmitted, there is no video to lose. In one embodiment, the controller specifies a time, or an amount of data such that the switch occurs during the VBI or HBI.

In one embodiment, the controller specifies a point in a stream of packets where a switch should be made. This can involve specifying a number of packets after the end of a stream, or after the start of a stream, or can be relative to some other point in the stream, e.g., the third packet after a packet containing a particular flag should be the first packet sent to the new receivers. In one embodiment, the switch point is based on a time value, e.g., the switch should occur within 3 milliseconds after the switch signal is received or after some point in the data stream, e.g., the number of frames after the switch signal is received. In one embodiment, all elements (e.g., sources, receivers, controllers, and transit nodes) are all provided with a single reference time source to facilitate synchronized switching.

At 708, the controller determines the receivers to which content associated with a particular source or ingress interface should be sent. In one embodiment, this involves selecting, either manually by an operator or automatically, one or more receivers that have joined a multicast group to receive content from a particular source. For example, the controller can select a first set of monitors of a larger group of monitors in a broadcast facility to receive content from a first source. Content from a second source can be transmitted to a second set of monitors of the larger group of monitors. Each of the monitors in the larger group of monitors has joined a multicast group to which both the first source and second source are authorized (e.g., by the controller) to provide content. In one embodiment, the controller creates a list or table with an entry for each source. The table includes information identifying the source, or ingress interface, and one or more receivers to which content from the source should be transmitted by the BFIR to which the source is coupled (or on which the ingress interface is located).

The controller generates, at 710, a bit string corresponding to the set of receivers. That is, for each receiver included in the list of receivers associated with a particular source or ingress interface, the controller identifies a bit position associated with a receiver interface via which the receiver is reachable. The controller sets a bit in a bit string to one for each of the receiver interfaces via which one or more of the receivers in the list is reachable.

The controller, at 714, sends information, e.g., in a message such as a control command, to one or more BFIRs. The information includes, in one embodiment, a bit string indicating the new set of receivers to which content should be transmitted and/or information identifying the source or ingress interface associated with the bit string. In one embodiment, the controller transmits multicast group information to the BFIR in addition to, or in the alternative to, source information. In one embodiment, the controller also transmits timing information to the BFIR, as discussed with regard to 704. As noted above, receivers can act as sources. In an embodiment in which a receiver acts as a source, the controller sends the bit string to the BFER to which the receiver is coupled.

FIG. 7B is an example control table generated by a controller, such as controller 220 of FIG. 2. Control table 750 includes at 752, a column that indicates a point in time. The point in time can be a time value, a point in a data stream, an occurrence of an event, or any other marker that can be used to differentiate between a first interval and a second interval. At 754, control table 750 includes a column that indicates a group ID, such as a multicast group ID. In one embodiment, the multicast group ID is used to differentiate between multiple sources behind a single ingress interface. At 756, control table 750 includes a column that identifies a source, such as one of sources 252-254 of FIG.

2. Instead of, or in addition to the information identifying sources, table 750 can include information indentifying ingress interfaces. In one embodiment, a source indicated at 756 provides content to the BFERs corresponding to the receiver interfaces associated with the set bits in the bit string in the corresponding entry. The content is forwarded from the source (e.g., by a BFIR coupled to the source) using the indicated bit string to the BFERs during the time indicated in the corresponding entry. The BFERs provide the content to the appropriate receivers.

As shown in control table 750, at t3, the source used to provide content to the receiver interfaces corresponding to bit positions 1000, 0100, and 0001 changes from S1 to S2. In one embodiment, the controller can specify an ingress interface that should provide content to a given multicast group, instead of or in addition to specifying the source. The controller can specify that the ingress interface that is providing content should switch to a different ingress interface at a specified point. At 758, control table 750 includes a column that identifies which receivers are associated with the given source or ingress interface at the given time. In the example of FIG. 7B, at t1, receivers R1 and R2 are to receive content from source S1. At t2, the set of receivers to receive content from S1 is switched to include receivers R1, R3, and R4. At 760, control table 750 includes a column that identifies a bit string that has a bit set for each of the receiver interfaces corresponding to the receivers identified in column 758.

Figure 8A:
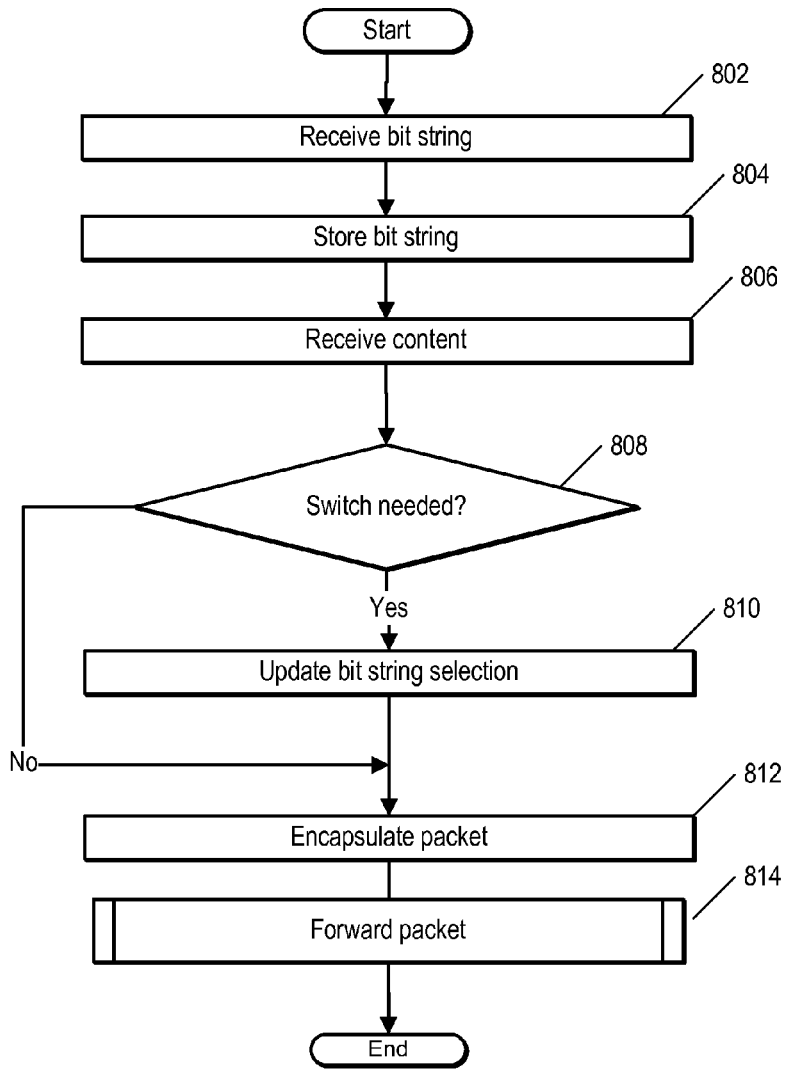
FIG. 8A is a flow chart illustrating an example process, according to the present description.

FIG. 8A is a flowchart illustrating an example process according to the present description. In one embodiment, FIG. 8A is performed by a BFIR, such as BFIR 206 of FIG. 2. At 802, the BFIR receives a bit string. In one embodiment the bit string is received from a controller, such as controller 220 of FIG. 2. In addition to the bit string, the BFIR can also receive, at 802, a set identifier, information identifying timing, and/or information identifying one or more sources of video content or ingress interfaces to which the sources are communicatively coupled. At 804, the BFIR stores the bit string. In one embodiment, the BFIR add the bit string to the bottom of a stack that includes one or more bit strings.

At 806, the BFIR receives video content from a source, such one of sources 252 through 254 of FIG. 2. At 808, the BFIR determines whether a switch is needed. Additional details regarding determining whether or not a switch is needed are described with regard to FIG. 8C.

If a switch is needed, the BFIR updates the bit string selection, at 810. In one embodiment, updating the bit string selection involves incrementing a pointer so that the pointer identifies the next bit string in a stack of bit strings. At 812, the BFIR encapsulates the bit string and the video content into a packet. Example packet formats are discussed with regard to FIG. 12. In one embodiment, the video content is encapsulated by the source. In this embodiment, the BFIR transmits the updated bit string selection to the source to use in encapsulating the video content. At 814, the BFIR forwards the packet, as discussed with regard to FIG. 13.

Figure 8B:
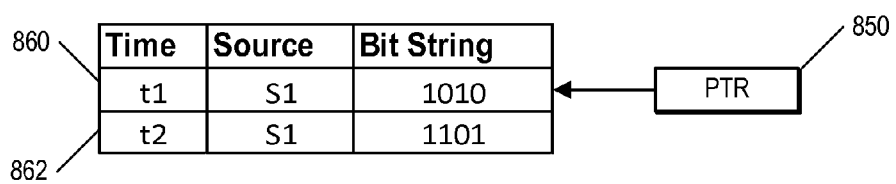
FIG. 8B is a simplified block diagram illustrating an example stack, according to the present description.

FIG. 8B shows an example pointer 850. The pointer points to an entry 860 in a stack of entries. The entry 860 includes a current bit string that is encapsulated in multicast data packets by a BFIR. In one embodiment, entry 860 also includes a time t1 at which the bit string becomes valid and should be inserted into packets forwarded by the BFIR. Entry 862 includes a time t2 at which the corresponding bit string should be inserted into packets. In response to detecting t2, the BFIR updates pointer 850 to point to entry 862 and begins encapsulating multicast data packets with the bit string corresponding to the entry for t2.

Figure 8C:
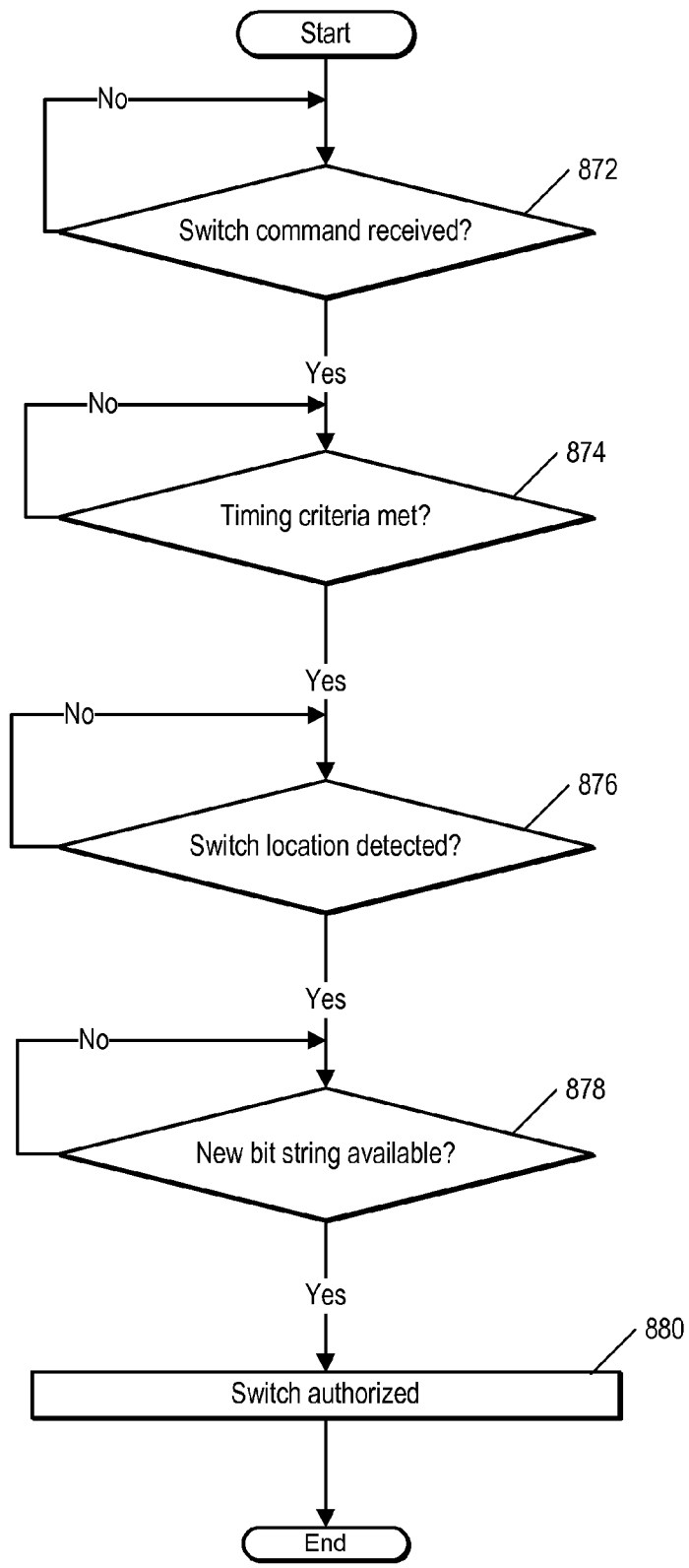
FIG. 8C is a flow chart illustrating an example process, according to the present description.

FIG. 8C is a flowchart illustrating an example process according to the present description. In one embodiment, the process shown in FIG. 8C is performed by a BFIR, such as BFIR 206 of FIG. 2. The process of FIG. 8C shows additional details of determining whether a switch is needed, as at 808 of FIG. 8A.

At 872, the BFIR determines whether a switch command has been received. That is, the BFIR determines whether a controller has sent a control command that indicates a switch is to be performed. If so, the BFIR determines whether a timing criterion has been met, at 874. In one embodiment, the switch command identifies a time, or other event, which triggers or enables a switch. For example, the switch command can include information indicating that a switch should be performed after a pre-specified time.

If the timing criterion is met, the BFIR determines at 876 whether a pre-specified switch location in a data stream has been detected. In one embodiment, this involves parsing one or more packets and determining whether a flag is set. For example, the BFIR can detect that a bit in an RTP header, such as the "M" bit is set. If the switch location is detected, the BFIR determines at 878 whether a new bit string is available. If so, at 880, the BIFR concludes that a switch is authorized.

FIG. 9A is an example bit indexed routing table (BIRT) 900 generated by a BFR, such as node 210 of FIG. 2. BIRT 900 includes three columns. The first column 902 includes information identifying a bit position and (optionally) set identifier for each receiver interface included in the BIER network (e.g., network 200 of FIG. 2). In one embodiment, the column also includes a BFR-ID, or virtual bit position (not shown). A virtual bit position can be implemented as an integer unique among the receiver interface in a BIER network. The second column 904 includes information identifying the corresponding receiver or receiver interface. In one embodiment, the information identifying the receiver or receiver interface is implemented as one or more IP addresses associated with the receiver or receivers reachable via the receiver interface associated with the BP. In another embodiment, the information identifying the receiver is implemented as an IP address for the BFER on which the receiver interface is located. In this embodiment, mapping the BP to a receiver interface is handled by the BFER corresponding to the IP address. The third column 906 includes one or more entries for the neighbor or neighbors via which the receiver interface associated with the BP is reachable along a shortest path from the BFR. A procedure for generating BIRTs is discussed in greater detail with regard to FIG. 10.

FIG. 9B is an example bit indexed forwarding table (BIFT) 950 generated, for example, by node 210 of FIG. 2. BIFT 950 is generated using the information in BIRT 900 of FIG. 9A. As shown, BIFT 950 includes a column 952 for a forwarding bit mask (FBM). BIFT 950 also includes a column 954 for neighbors. BIFT 950 indicates that each of the bit positions set in the FBM is reachable via the corresponding neighbor. For example, considering the first entry in BIFT 950, receiver interfaces corresponding to bit positions 1, 2, and 4 are reachable via neighbor D. This is reflected in FIG. 2 as receivers R1, R2, and R3 are all reachable via node D. Additional details on generating BIFTs are discussed with regard to FIG. 11.

Figure 10:
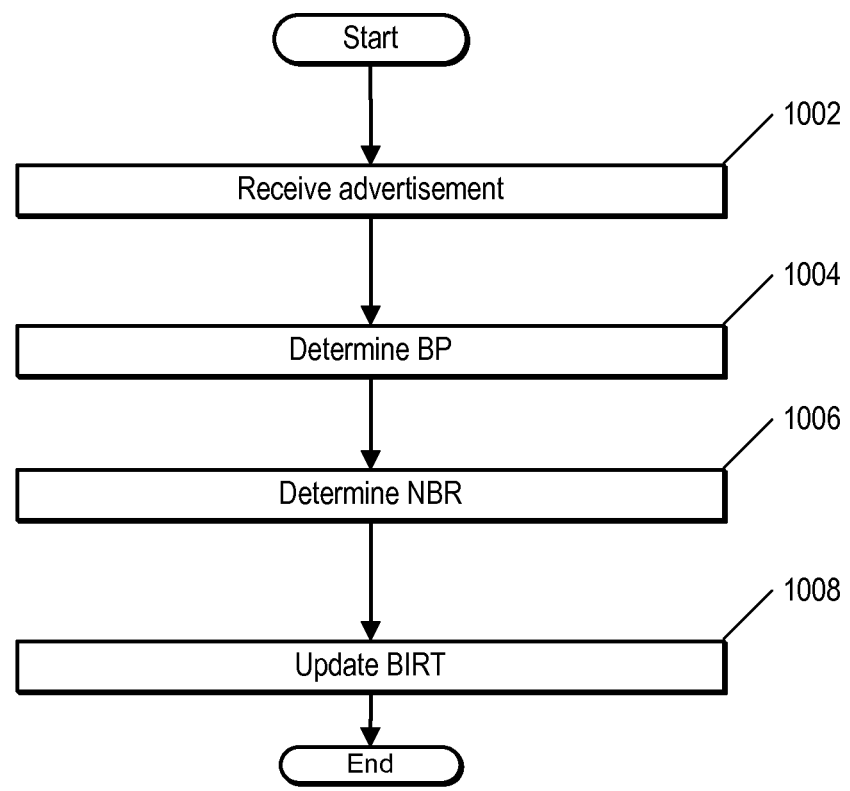
FIG. 10 is a flow chart illustrating an example process, according to the present description.

FIG. 10 is a flow chart illustrating an example process employed by a node, according to the present description. In one embodiment, FIG. 10 is performed by a BFR, such as BFR 210 of FIG. 2. At 1002, the BFR receives an advertisement generated by a BFER. In one embodiment, the advertisement is received via IGP and includes information identifying a mapping between a routable address associated with a receiver interface on the BFER, such as a router identifier, and a bit position and set identifier associated with the receiver interface. In response to receiving the advertisement, the BFR determines, at 1004, the BP associated with the receiver interface on the BFER that generated the advertisement. The BFR also determines the set identifier, if one is included in the advertisement.

At 1006, the BFR accesses its stored topology information to determine the next hop neighbor along the shortest path towards the BFER that generated the advertisement. At 1008, the BFR updates the BIRT. In one embodiment, this comprises adding an entry that includes information identifying the BFR ID and bit position of the receiver interface, as well as the neighbor via which the BFER that includes the receiver interface is reachable.

Figure 11:
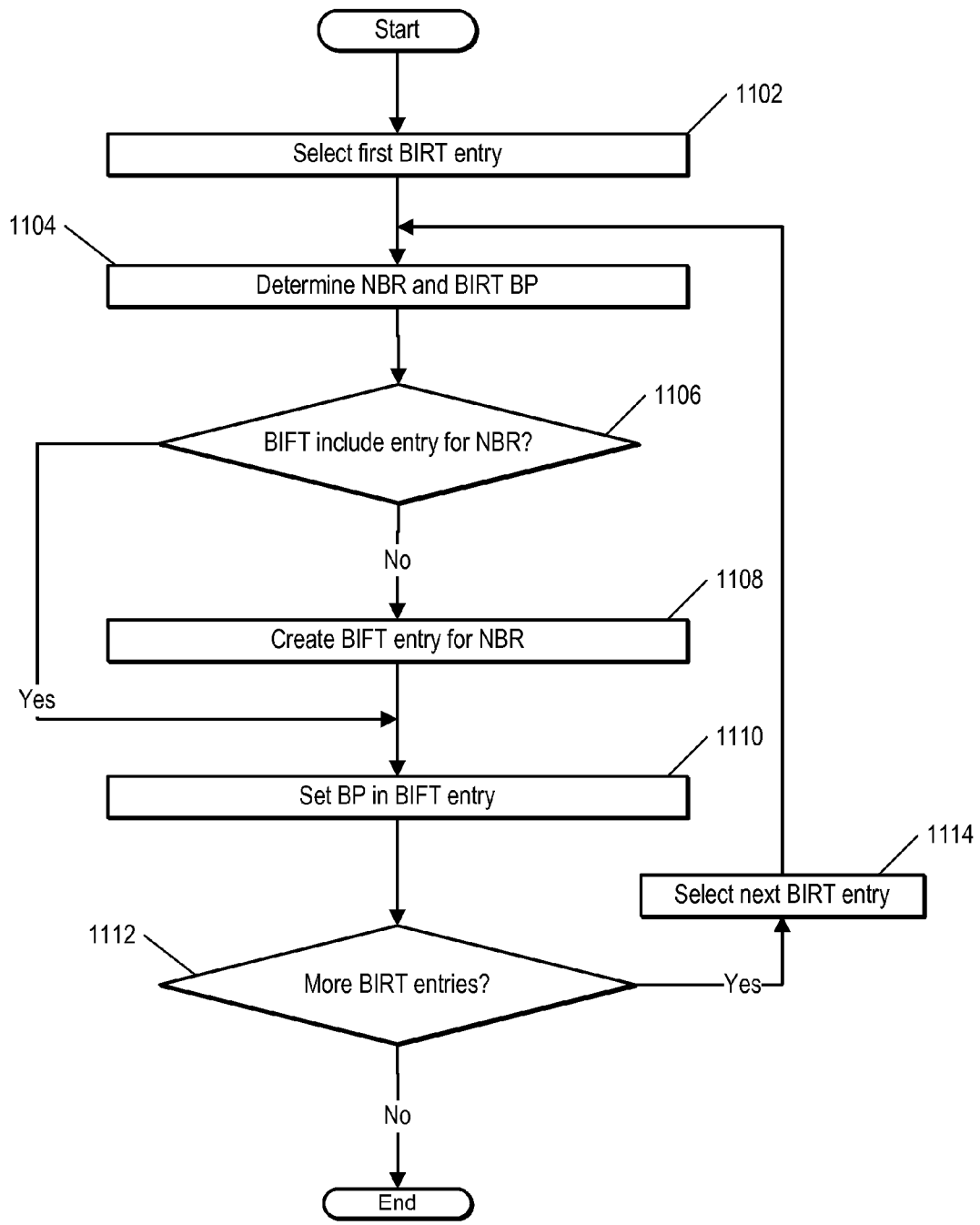
FIG. 11 is a flow chart illustrating an example process, according to the present description.

FIG. 11 is a flow chart illustrating an example process of generating a BIFT employed by a node, according to the present description. In one embodiment, FIG. 11 is performed by a BFR, such as BFR 210 of FIG. 2. At 1102, the BFR selects a first entry in the BFR's BIRT. At 1104, the BFR determines the neighbor and bit position associated with the entry. In one embodiment, the neighbor is identified by a BFR ID or prefix or other information. At 1106, the BFR determines whether the BIFT already includes an entry for the neighbor. In the case of the first BIRT entry, there will not be a BIFT entry corresponding to the neighbor identifying the BIRT entry. If there is no BIFT entry corresponding to the neighbor, the BFR creates a BIFT entry corresponding to the neighbor at 1108. At 1110, the BFR sets a bit in the FBM corresponding to the bit position identified in the BIRT entry. At 1112, the BFR determines whether the BIRT includes additional entries. If so, the BFR selects the next BIRT entry at 1114.

For example, considering BIRT 900 of FIG. 9A, at 1102, the BFR selects the first entry in the BIRT. In the example of BIRT 900, the first entry corresponds to neighbor D. Next, the BFR determines, at 1104, that the entry corresponds to BP 4. That is, receiver R1, which has been assigned BP 4, is reachable from the BFR via node D. Next, the BFR creates an entry in its BIFT for neighbor D and sets the fourth bit in the FBM. FIG. 9B shows that the entry corresponding to neighbor D has bit 4 set. The BFR then proceeds iteratively, next selecting the entry for neighbor D corresponding to bit 2, and so on. After performing the method shown in FIG. 11, the BFR will have a BIFT that includes one entry for each of the BFR's neighbors and each entry will include a forwarding bit mask that has a bit set for each of the receiver interfaces reachable that neighbor.

FIG. 12A shows an example IPv6 packet 1200. Other fields and headers can be included, such as an Ethernet header and/or a High Bitrate Media Transport (HBRMT) header, as described in SMPTE ST 2022-6. At 1202, packet 1200 includes an IP header 1202. IPv6 headers typically include 40 bytes (though additional information can be included) of control and address information (20 bytes in the case of IPv4).

At 1204, packet 1200 includes a BIER header. Additional details of the BIER header are discussed with regard to FIG. 12C. At 1206, packet 1200 includes a UDP header 1206. UDP header 1206 adds 8 bytes of overhead, including source and destination port numbers, datagram length, and (optionally) a checksum.

At 1208, packet 1200 includes a Real-time Transport Protocol (RTP) header 1208. RTP is a protocol used for transporting real-time data over IP networks. RTP header 1208 typically adds 12 bytes of overhead (though additional information can be included) including control fields, sequence number, timestamp, and SSRC identifier. Additional details of the RTP header are discussed with regard to FIG. 12B. At 1210, packet 1200 includes payload information. The payload information is video content, control traffic, and the like. If encapsulated according to SMPTE ST 2022-6, the payload includes 1376 bytes of video data.

Figure 12B:
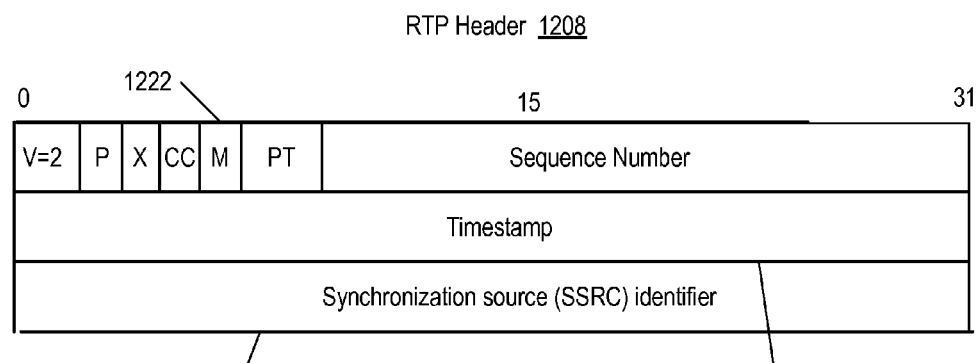
FIG. 12B is an example header format, according to the present description.

FIG. 12B shows an example RTP header 1208. At 1222, RTP header 1208 includes an M bit or marker bit. The marker bit being set to 1 indicates that the packet including this RTP header is the last packet of a video frame. In one embodiment, switching source or receiver membership should occur within a pre-specified time interval (whether measured in seconds or packets) after detecting the last packet of a video frame. In all packets other than the last packet in the video frame, the marker bit is set to 0. Time stamp 1226 and synchronization source identifier 1228 can be used to identify media datagrams.

Figure 12C:
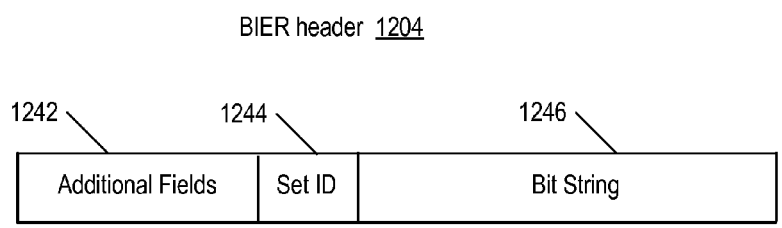
FIG. 12C is an example header format, according to the present description.

Additional details of BIER header 1204 are shown in FIG. 12C. 1242 includes additional fields used in processing the BIER header, such as a TTL field, entropy field, QOS field, topology ID field, Source ID field, Context field, AFI field, and the like. A field for the set identifier is shown at 1244, and a field for the bit string is shown at 1246.

Figure 13:
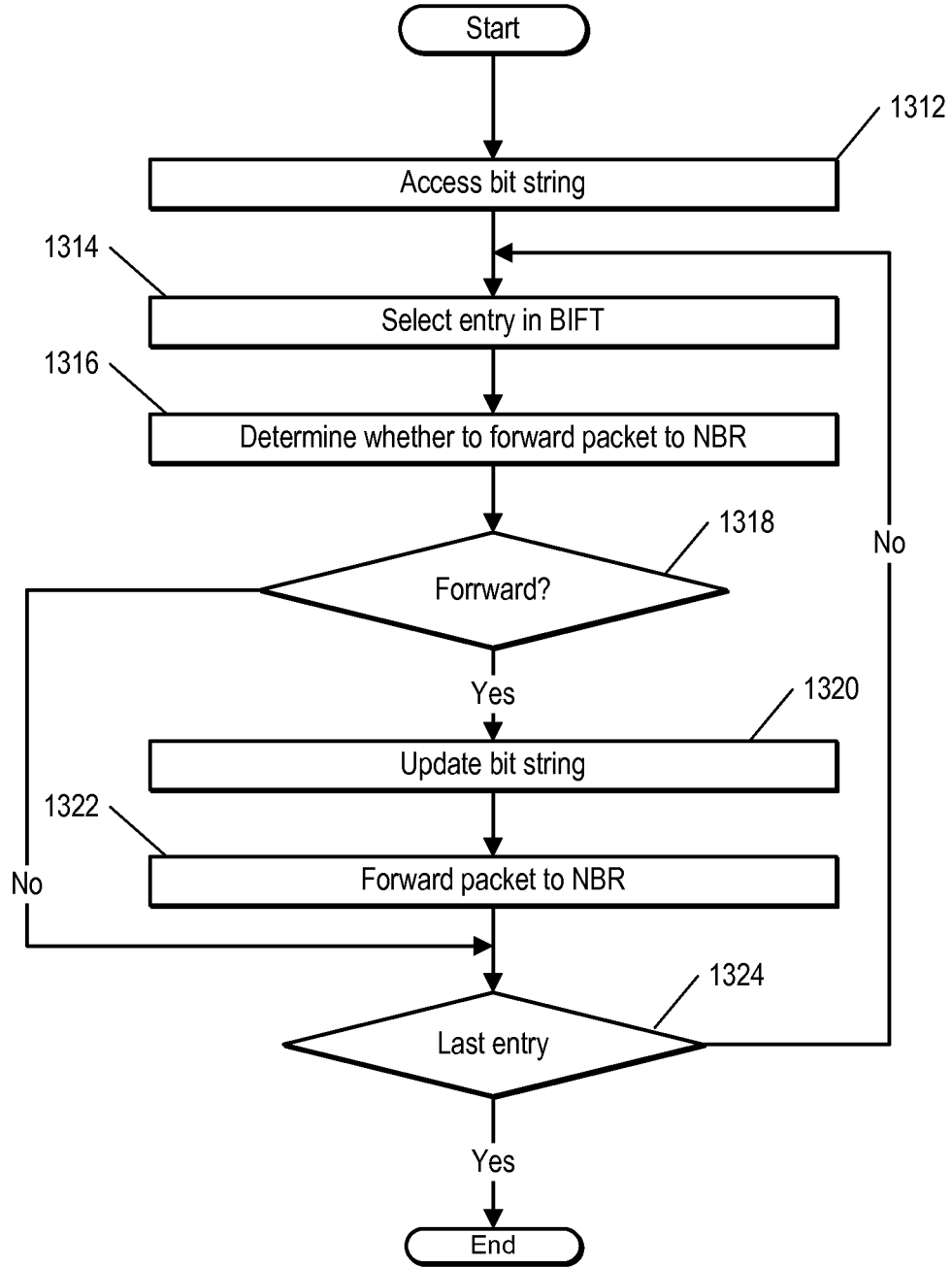
FIG. 13 is a flow chart illustrating an example process, according to the present description.

FIG. 13 is a flow chart illustrating an example process of forwarding a multicast data packet employed by a node, according to the present description. In one embodiment, the process is performed by a BFR, such as BFR 210 of FIG. 2. The process of FIG. 13 involves using a BIFT, such as BIFT 950 of FIG. 9B.

In response to receiving a multicast data packet, and determining that the multicast data packet is to be forwarded to one or more neighbors, as discussed in FIG. 5, the BFR accesses the multicast data packet's bit string at 1312. In one embodiment, accessing the bit string involves identifying an encapsulation protocol, and locating the bit string in the multicast data packet based on the encapsulation protocol type. At 1314, the BFR selects an entry in the BFR's BIFT. In one example, the first entry in the BIFT is selected and the BFR performs an in-order traversal of the BIFT.

The BIFT determines, at 1316, whether to forward the multicast data packet to the neighbor associated with the selected BIFT entry. In one embodiment, this involves performing an AND operation between the bit string in the multicast data packet and the FBM in the selected BIFT entry. If the result of the AND operation is true, as determined at 1318, the method proceeds to 1320, and the BFR updates the bit string in the multicast data packet. In one embodiment, this involves performing an AND operation between the bit string in the multicast data packet and the bit string in the selected BIFT entry and writing the results of the AND operation into the bit string in the multicast data packet. This has the effect of clearing bits in bit positions which are not reachable via the neighbor to which the multicast data packet is being forwarded. Doing so prevents duplication or looping problems.

At 1322, the BFR forwards the multicast data packet to the neighbor corresponding to the BIFT entry. At 1324, the BFR determines whether additional entries remain in the BIFT, if so, the method returns to 1314, and the next entry in the BIFT is selected.

Figure 14:
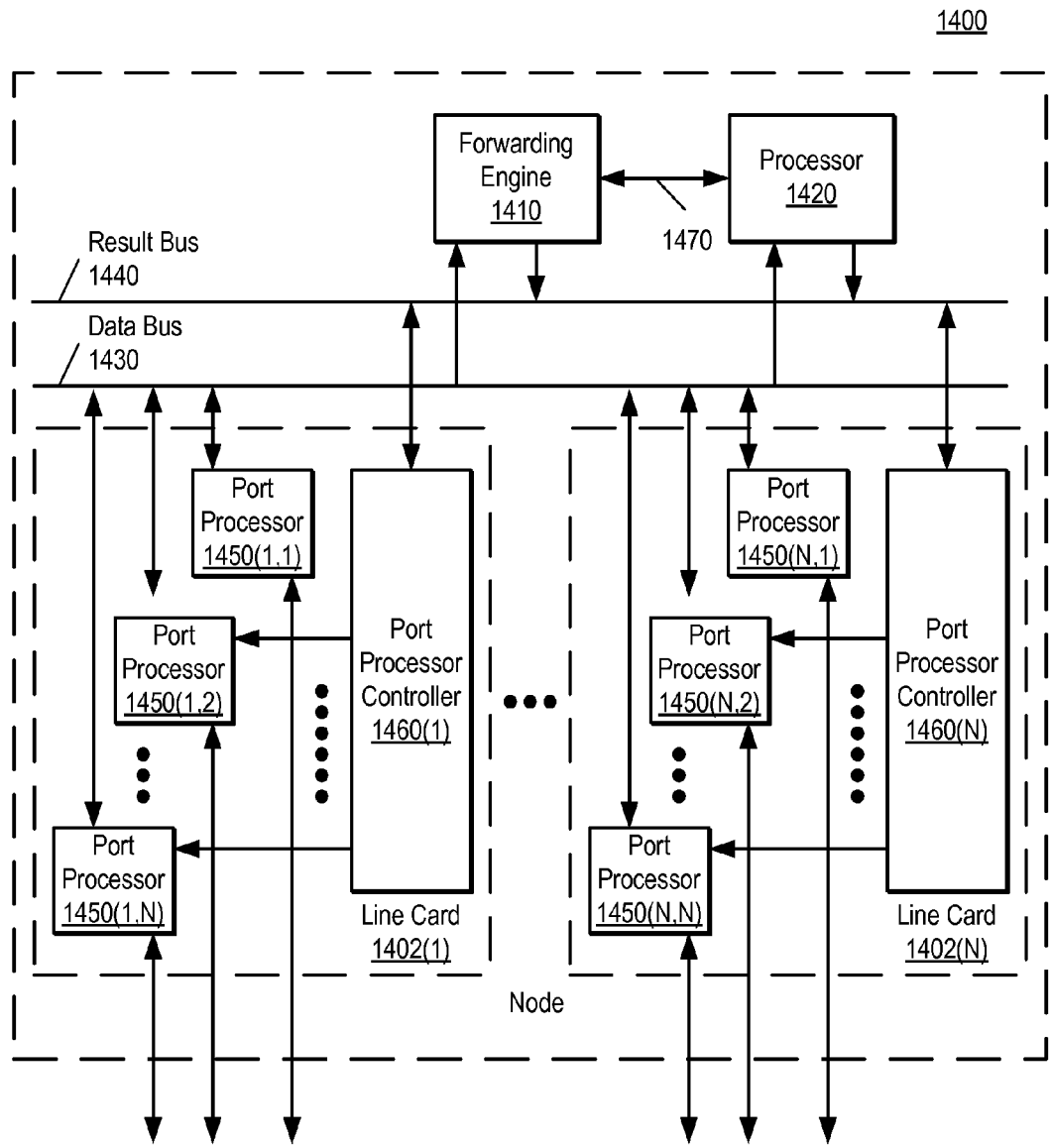
FIG. 14 is a block diagram illustrating certain components of an example node that can be employed in the network of FIG. 2.

FIG. 14 is a block diagram illustrating certain additional and/or alternative components of nodes that can be employed, for example in the network shown in FIG. 3. In this depiction, node 1400 includes a number of line cards (line cards 1402(1)-(N)) that are communicatively coupled to a forwarding engine or packet forwarder 1410 and a processor 1420 via a data bus 1430 and a result bus 1440. Line cards 1402(1)-(N) include a number of port processors 1450(1,1)-(N,N) which are controlled by port processor controllers 1460(1)-(N). It will also be noted that forwarding engine 1410 and processor 1420 are not only coupled to one another via data bus 1430 and result bus 1440, but are also communicatively coupled to one another by a communications link 1470.

The processors 1450 and 1460 of each line card 1402 may be mounted on a single printed circuit board. When a packet or packet and header are received, the packet or packet and header may be identified and analyzed by router 1400 in the following manner. Upon receipt, a packet (or some or all of its control information) or packet and header is sent from the one of port processors 1450(1,1)-(N,N) at which the packet or packet and header was received to one or more of those devices coupled to data bus 1430 (e.g., others of port processors 1450(1,1)-(N,N), forwarding engine 1410 and/or processor 1420). Handling of the packet or packet and header can be determined, for example, by forwarding engine 1410. For example, forwarding engine 1410 may determine that the packet or packet and header should be forwarded to one or more of port processors 1450(1,1)-(N, N). This can be accomplished by indicating to corresponding one(s) of port processor controllers 1460(1)-(N) that the copy of the packet or packet and header held in the given one(s) of port processors 1450(1,1)-(N,N) should be forwarded to the appropriate one of port processors 1450(1,1)-(N,N). In addition, or alternatively, once a packet or packet and header has been identified for processing, forwarding engine 1410, processor 1420 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 15:
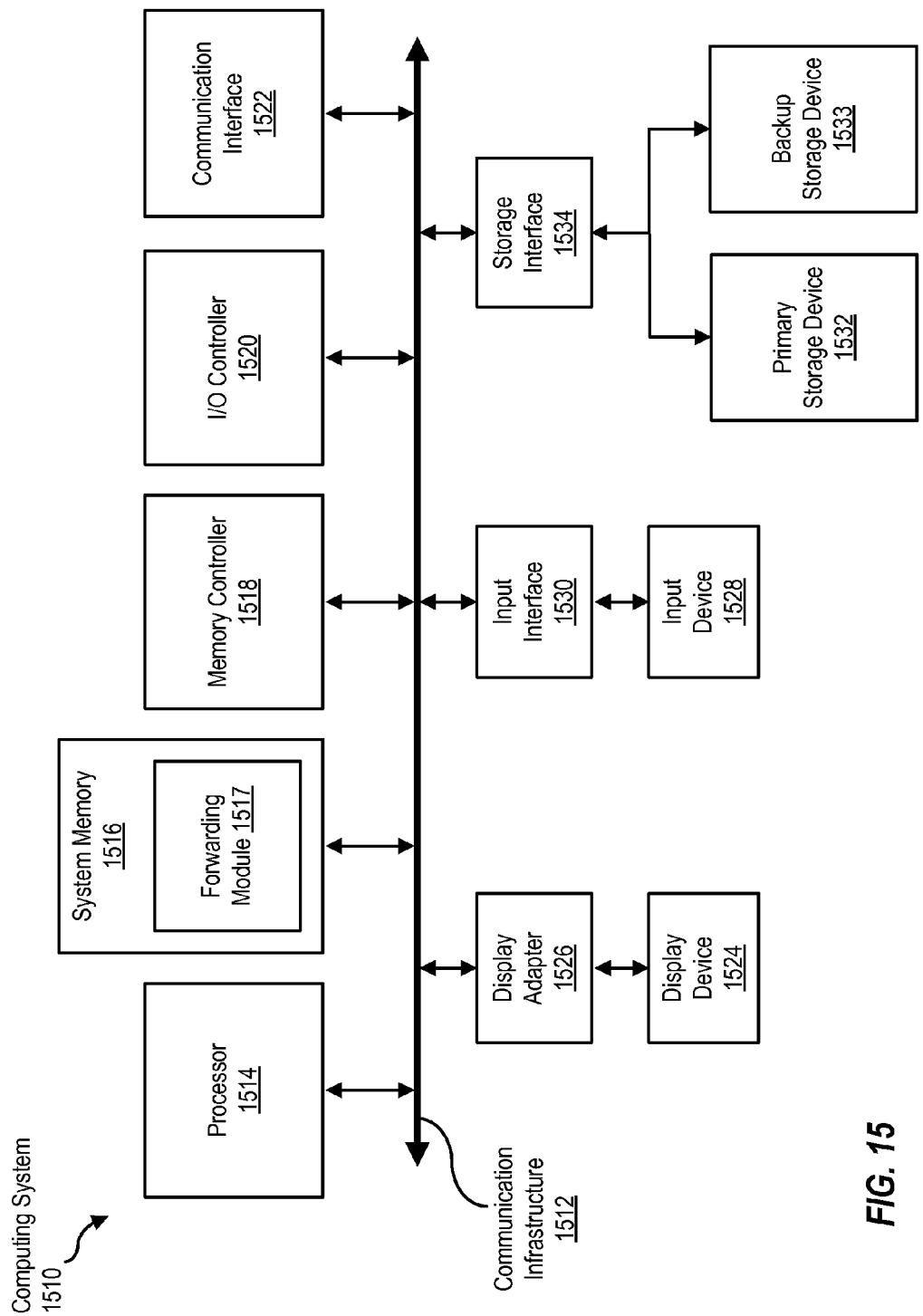
FIG. 15 is a block diagram depicting a computer system suitable for implementing embodiments of the systems described herein.

FIG. 15 is a block diagram of a computing device, illustrating how a forwarding module can be implemented in software, as described above. Computing system 1510 broadly represents any single or multi-processor computing device or system capable of executing computer-readable instructions. Examples of computing system 1510 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1510 may include at least one processor 1515 and a system memory 1516. By executing the software that implements a forwarding module 1517, computing system 1510 becomes a special purpose computing device that is configured to perform packet forwarding, in the manner described above.

Processor 1515 generally represents any type or form of processing unit capable of processing data or interpreting and executing instructions. In certain embodiments, processor 1515 may receive instructions from a software application or module. These instructions may cause processor 1515 to perform the functions of one or more of the embodiments described and/or illustrated herein. For example, processor 1515 may perform and/or be a means for performing the operations described herein. Processor 1515 may also perform and/or be a means for performing any other operations, methods, or processes described and/or illustrated herein.

System memory 1516 generally represents any type or form of volatile or non-volatile storage device or medium capable of storing data and/or other computer-readable instructions. Examples of system memory 1516 include, without limitation, random access memory (RAM), read only memory (ROM), flash memory, or any other suitable memory device. Although not required, in certain embodiments computing system 1510 may include both a volatile memory unit (such as, for example, system memory 1516) and a non-volatile storage device (such as, for example, primary storage device 1532, as described in detail below). In one example, program instructions executable to implement a forwarding module configured to forward multicast data packets may be loaded into system memory 1516.

In certain embodiments, computing system 1510 may also include one or more components or elements in addition to processor 1515 and system memory 1516. For example, as illustrated in FIG. 15, computing system 1510 may include a memory controller 1515, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an Industry Standard Architecture (ISA), Peripheral Component Interconnect (PCI), PCI express (PCIe), or similar bus) and a network.

Memory controller 1515 generally represents any type or form of device capable of handling memory or data or controlling communication between one or more components of computing system 1510. For example, in certain embodiments memory controller 1515 may control communication between processor 1515, system memory 1516, and I/O controller 1520 via communication infrastructure 1512. In certain embodiments, memory controller 1515 may perform and/or be a means for performing, either alone or in combination with other elements, one or more of the operations or features described and/or illustrated herein.

I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1515, system memory 1516, communication interface 1522, display adapter 1526, input interface 1530, and storage interface 1534.

Communication interface 1522 broadly represents any type or form of communication device or adapter capable of facilitating communication between computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer) for display on display device 1524.

As illustrated in FIG. 15, computing system 1510 may also include at least one input device 1528 coupled to communication infrastructure 1512 via an input interface 1530. Input device 1528 generally represents any type or form of input device capable of providing input, either computer or human generated, to computing system 1510. Examples of input device 1528 include, without limitation, a keyboard, a pointing device, a speech recognition device, or any other input device.

As illustrated in FIG. 15, computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a floppy disk drive, a magnetic tape drive, an optical disk drive, a flash drive, or the like. Storage interface 1534 generally represents any type or form of interface or device for transferring data between storage devices 1532 and 1533 and other components of computing system 1510. A storage device like primary storage device 1532 can store information such as routing tables and forwarding tables.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15.

Computing system 1510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1510 for storage in memory via a network such as the Internet or upon a carrier medium.

The computer-readable medium containing the computer program may be loaded into computing system 1510. All or a portion of the computer program stored on the computer-readable medium may then be stored in system memory 1516 and/or various portions of storage devices 1532 and 1533. When executed by processor 1515, a computer program loaded into computing system 1510 may cause processor 1515 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1510 may be configured as an application specific integrated circuit (ASIC) adapted to implement one or more of the embodiments disclosed herein.

Figure 16:
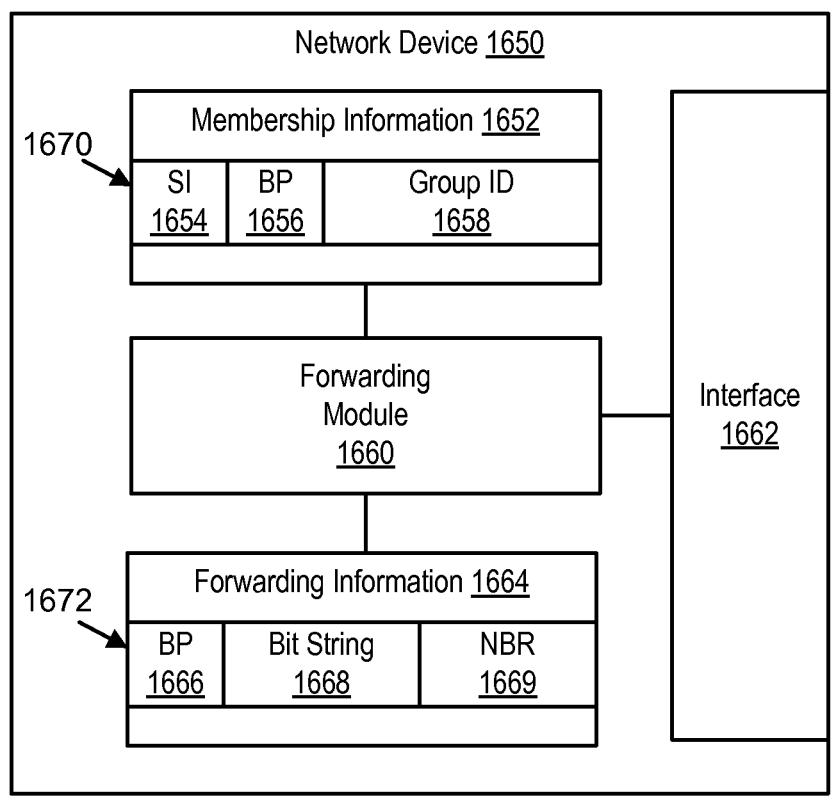
FIG. 16 is a block diagram depicting a network device suitable for implementing embodiments of the systems described herein.

FIG. 16 is a block diagram of an exemplary network device that may be associated with a node in network 200 of FIG. 2. Network device 1650 of FIG. 16 may, for example, be associated with BIER-enabled node 206 in FIG. 2. In some cases "node" as used herein encompasses one or more network devices associated with the node. "Network devices" as used herein includes various devices, such as routers, switches, or network controllers that perform routing and/or forwarding functions and support one or more routing and/or switching protocols. A network device maintains one or more routing and/or forwarding tables that store routing and/or forwarding information identifying paths to various data sources and/or data consumers. In, for example, a multicast-enabled node, a network device implements a multicast routing protocol that is used to convey multicast data packets from a multicast source to a multicast receiver.

In the embodiment of FIG. 16, network device 1650 includes storage for membership information 1652, storage for forwarding information 1664, a forwarding module 1660, and an interface 1662. Interface 1662 is coupled to send and receive packets and/or other network messages. It is noted that network device 1650 may include additional interfaces, and that each interface can be a logical or physical interface. In one embodiment, interface 1662 includes one or more ports.

Forwarding module 1660 is configured to perform forwarding based on the stored forwarding information 1664. Forwarding module 1660 is also configured to update the stored membership information 1652 and forwarding information 1664. Forwarding module 1660 can implement one or more instances of a layer 3 protocol and/or a layer 2 protocol.

Entry 1670 provides an example of membership information stored in memory of a network device. As shown, entry 1670 includes a set identifier 1654, information 1656 identifying a bit position (BP), and information 1658 identifying a multicast group. The SI and BP identify a node with which entry 1670 is associated, and the multicast group information identifies a multicast group to which the corresponding node is subscribed. The storage for membership information 1652 is, in one embodiment, implemented as a group membership table.

Entry 1672 provides an example of forwarding information that can be stored in memory of a network device. As shown, entry 1672 includes information 1666 identifying a BP, a bit string or bit array 1668, and information 1669 identifying a neighbor. Forwarding module 1660 uses the information in entry 1672 to forward multicast data packets to the interface associated with the neighbor identified in the entry. The storage for forwarding information 1664 is, in one embodiment, implemented as a bit indexed forwarding table (BIFT).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a node comprising a memory and one or more processors, a first bit string from a controller, wherein each bit in the first bit string corresponds to a receiver in a first set of receivers;
   receiving, by the node, a first packet of a video stream from a source;
   encapsulating, by the node, the first packet with the first bit string;
   forwarding the node, the first packet to the first set of receivers;
   receiving, by the node, a second bit string from the controlled, wherein each bit in the second bit string corresponds to a receiver in a second set of receivers;
   detecting, by the node, a switch trigger;
   selecting, by the node, the second bit string based at least in part on detecting the switch trigger;
   receiving, by the node, a second packet of the video stream from the source;
   encapsulating, by the node, the second packet with the second bit string; and
   forwarding, by the node, the second packet to the second set of receivers.

2. The method of claim 1, wherein the switch trigger corresponds to one of a vertical blanking interval or a horizontal blanking interval associated with the video stream.

3. The method of claim 1, wherein the node comprises an ingress router.

4. The method of claim 1, wherein the switch trigger indicates the end of a portion of the video stream.

5. The method of claim 1, wherein
the switch trigger comprises a bit included in a Real-time Transfer Protocol (RTP) frame.

6. The method of claim 1, wherein the video stream is encapsulated, using a Serial Data Interface (SDI) format, into a plurality of packets including the first packet and the second packet.

7. The method of claim 1, wherein
selecting the second bit string comprises updating a pointer to point to the second bit string instead of to the first bit string.

8. The method of claim 1, wherein
a time interval between detecting the switch trigger and the forwarding the second packet is less than a predetermined value.

9. A system comprising:
a node configured to:
receive a first bit string from a controller, wherein each bit in the first bit string corresponds to a receiver in a first set of receivers;
receive a first packet of a video stream from a source;
encapsulate the first packet with the first bit string;
forward the first packet to the first set of receivers;
receive a second bit string from the controller, wherein each bit in the second bit string corresponds to a receiver in a second set of receivers;
detect a switch trigger;
select the second bit string based at least in part on detecting the switch trigger;
receive a second packet of the video stream from the source;
encapsulate the second packet with the second bit string; and
forward the second packet to the second set of receivers.

10. The system of claim 9, wherein the switch trigger corresponds to one of a vertical blanking interval or a horizontal blanking interval associated with the video stream.

11. The system of claim 9, wherein the video stream is encapsulated, using a Serial Data Interface SDI format, into a s plurality of packets including the first packet and the second packet.

12. The system of claim 9, wherein the switch trigger indicates the end of a portion of video data.

13. The system of claim 9, wherein the node comprises an ingress router.

14. The system of claim 9, wherein
a time interval between detecting the switch trigger and the forwarding the second packet is less than a predetermined value.

15. A non-transitory computer readable storage medium comprising instructions that are executable by one or more processors to perform operations comprising:
receiving a first bit string from a controller, wherein each bit in the first bit string corresponds to a receiver in a first set of receivers;
receiving a first packet of a video stream from a source;
encapsulating the first packet with the first bit string;
forwarding the first packet to the first set of receivers;
receiving a second bit string from the controller, wherein each bit in the second bit string corresponds to a receiver in a second set of receivers;
detecting a switch trigger;
selecting the second bit string based at least in part on detecting the switch trigger;
receiving a second packet of the video stream from the source;
encapsulating the second packet with the second bit string; and
forwarding the second packet to the second set of receivers.

16. The non-transitory computer readable storage medium of claim 15, wherein the switch trigger corresponds to a location of a vertical blanking interval or a horizontal blanking interval in the video stream.

17. The non-transitory computer readable storage medium of claim 15, wherein the switch trigger comprises a bit included in a Real-time Transfer Protocol (RTP) frame of the first packet.

18. The non-transitory computer readable storage medium of claim 15,
wherein the switch trigger indicates the end of a portion of video data.

19. The non-transitory computer readable storage medium of claim 15, wherein selecting the second bit string comprises modifying a pointer to point to the second bit string instead of to the first bit string.

20. The non-transitory computer readable storage medium of claim 15, wherein a time interval between detecting the switch trigger and the forwarding the second packet is less than a predetermined value.

* * * * *